US009891741B2

(12) United States Patent
Huang et al.

(10) Patent No.: US 9,891,741 B2
(45) Date of Patent: Feb. 13, 2018

(54) CONTROLLER FOR INTERFACING WITH AN INTERACTIVE APPLICATION

(71) Applicant: Sony Interactive Entertainment Inc., Tokyo (JP)

(72) Inventors: Ennin Huang, Foster City, CA (US); Anton Mikhailov, Campbell, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/283,269

(22) Filed: Sep. 30, 2016

(65) Prior Publication Data
US 2017/0017331 A1   Jan. 19, 2017

Related U.S. Application Data

(63) Continuation of application No. 13/488,421, filed on Jun. 4, 2012.

(51) Int. Cl.
| | |
|---|---|
| A63F 9/24 | (2006.01) |
| G06F 3/041 | (2006.01) |
| G06F 3/01 | (2006.01) |
| G06F 3/0354 | (2013.01) |
| A63F 13/20 | (2014.01) |
| A63F 13/214 | (2014.01) |
| A63F 13/218 | (2014.01) |
| A63F 13/22 | (2014.01) |
| A63F 13/335 | (2014.01) |
| G06F 3/0488 | (2013.01) |

(52) U.S. Cl.
CPC ............ *G06F 3/0414* (2013.01); *A63F 13/06* (2013.01); *A63F 13/214* (2014.09); *A63F 13/218* (2014.09); *A63F 13/22* (2014.09); *A63F 13/335* (2014.09); *G06F 3/016* (2013.01); *G06F 3/03547* (2013.01); *G06F 3/041* (2013.01); *G06F 3/0488* (2013.01); *A63F 2300/1018* (2013.01); *A63F 2300/1037* (2013.01); *A63F 2300/1068* (2013.01); *A63F 2300/6045* (2013.01)

(58) Field of Classification Search
CPC ................................. A63F 13/00; G06F 19/00
See application file for complete search history.

(56) References Cited

U.S. PATENT DOCUMENTS 9,244,562 B1 *   1/2016   Rosenberg .......... G06F 3/04847
9,454,270 B2 *   9/2016   Marsden ................. G06F 3/044
(Continued)

*Primary Examiner* — Dmitry Suhol
*Assistant Examiner* — Ankit Doshi
(74) *Attorney, Agent, or Firm* — Martine Penilla Group, LLP

(57) ABSTRACT

A controller for interfacing with an interactive application includes an interface region disposed on a surface of a body of the controller. The interface region includes a plurality of interface elements for providing input to the interactive application. One of the interface elements is an input surface that is defined by an indentation and is configured to receive touch input. Plurality of sensors disposed under the input surface detects movement of a finger of a user. Processing circuitry is used to analyze the movement of the finger of the user over the input surface and transmit signals that are used by the interactive application to drive interaction in the interactive application.

20 Claims, 11 Drawing Sheets

(56) References Cited

U.S. PATENT DOCUMENTS

| | | | |
|---|---|---|---|
| 2006/0111180 A1* | 5/2006 | Cheng | A63F 13/06 463/36 |
| 2010/0105480 A1* | 4/2010 | Mikhailov | A63F 13/06 463/38 |
| 2011/0172009 A1* | 7/2011 | Tan | A63F 13/10 463/31 |
| 2012/0277000 A1* | 11/2012 | Vange | A63F 13/06 463/37 |

* cited by examiner

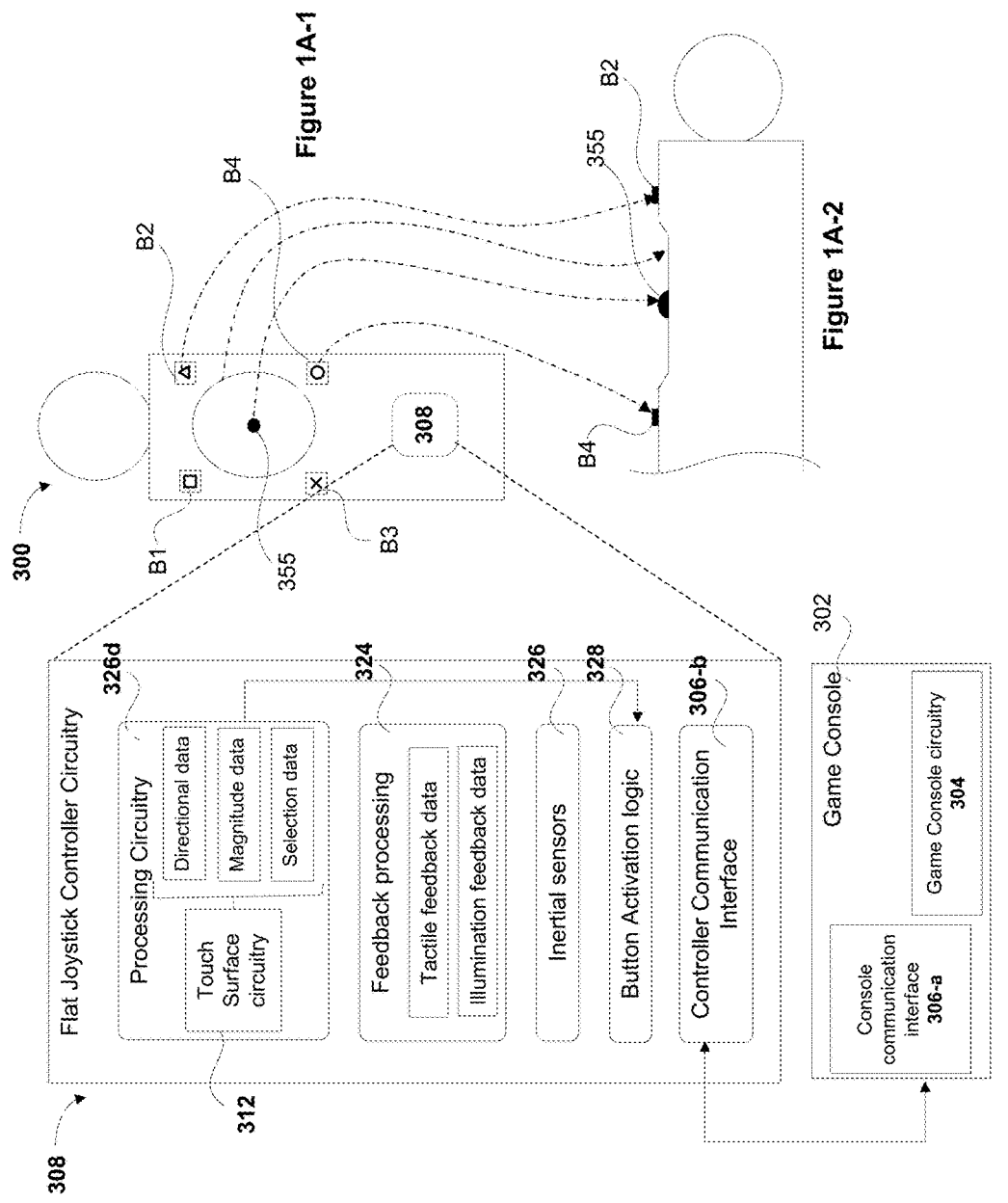

Movement of user's finger on the input surface

Input surface movement of user's finger on input surface

User input on the input surface

×D
×C
×B
×A

Related movement of a virtual object in a game appcn

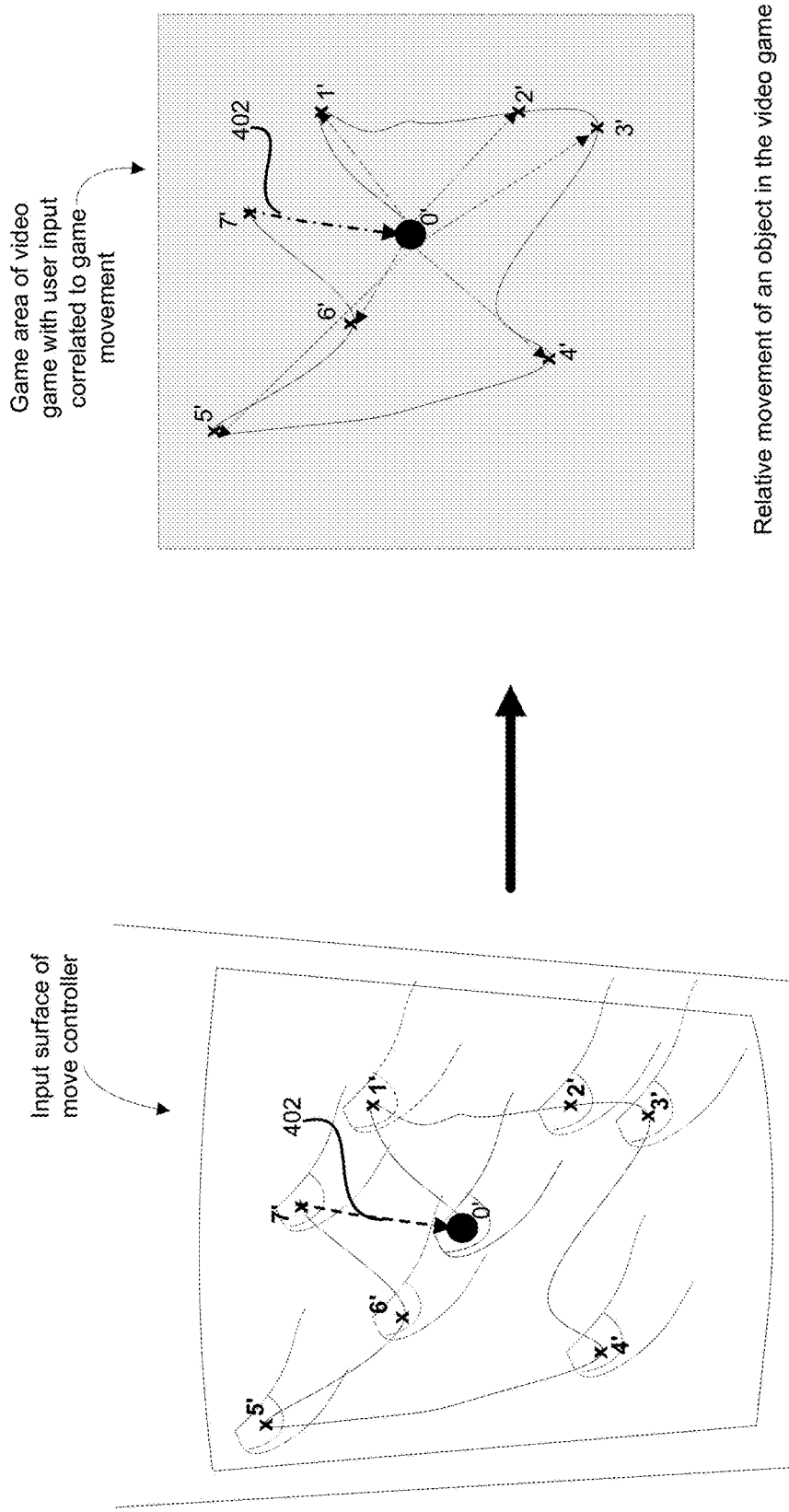

CONTROLLER FOR INTERFACING WITH AN INTERACTIVE APPLICATION

CLAIM OF PRIORITY

This application is a continuation of and claims the benefit, under 35 U.S.C. § 120, to co-pending U.S. patent application Ser. No. 13/488,421, filed Jun. 4, 2012, and entitled, "Flat Joystick Controller," which is incorporated herein by reference in its entirety.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a console. As is well known, the console is designed to connect to a monitor (usually a television) and enable user interaction through handheld controllers. The console is designed with specialized processing hardware, including a CPU, a graphics synthesizer for processing intensive graphics operations, a vector unit for performing geometry transformations, and other glue hardware, firmware, and software. The console is further designed with an optical disc tray for receiving game compact discs for local play through the console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. The gaming system includes a console, a wireless controller and a camera. The wireless controller enables a user to accomplish a richer interactive gaming experience by allowing position and movement tracking of the controller by the gaming system that relates to the player's movements and use these movements as inputs for the game. The controller has undergone tremendous improvements since its introduction and such improvements have enhanced and enriched the user's gaming experience. For certain games, however, the controller can still benefit from additional improvements.

It is within this context that embodiments of the invention arise.

SUMMARY OF THE INVENTION

Broadly speaking, the present invention allows for three-dimensional control with a multi-positional controller. The multi-positional controller enables control for a variety of applications and simulations while providing an intuitive interface to interact in both two-dimensional and three-dimensional renderings of the computer programs being executed through a game client.

A game client is one of a dedicated console or a server based console. In the former embodiment, the game client executes a locally stored program to render interactive game play. In this embodiment, the game client can be connected to the internet to enable online interactive game play. In the latter embodiment, the game client is connected to server processing the program via the internet. In this embodiment, the game client is similar to a terminal where storage and processing of the program is performed at a remote server.

In one embodiment, a controller for interfacing with an interactive application executing on a computer, is disclosed. The controller includes an interface region that is disposed on a surface of a body of the controller. The interface region includes a plurality of interface elements that are configured for providing input to the interactive application. One of the plurality of interface elements is an input surface that is configured to receive touch input. The input surface is defined by an indentation in a portion on the surface of the body of the controller. A plurality of sensors are disposed under the input surface for detecting movement of a finger of a user. Processing circuitry of the controller is used to analyze the movement of the finger of the user over the input surface and transmit signals that are used by the interactive application to drive interaction within the interactive application.

In a traditional controller that includes joysticks, it is hard to keep a user's thumb still while the user provides input by engaging various motions with the joysticks. This is due to the fact that in the joysticks, the thumb's support moves. However, using a touch input surface, the thumb can be kept still while continuing to provide the user's input by pressing on the input surface. The pressing of the user's finger on the input surface causes friction that is recognized as the user's engagement.

In another embodiment, a controller for interfacing with an interactive application executing on a computer, is disclosed. The controller includes an interface region that is disposed on a surface of a body of the controller. The interface region includes a plurality of interface elements that are configured for providing input to the interactive application. The plurality of interface elements includes a first input surface and a second input surface that are configured to receive touch input. The first input surface is defined by an indentation in a first portion on the surface of the body of the controller. A first set of sensors are disposed under the first input surface for detecting movement of a finger of a user over the first input surface. The second input surface is defined by the indentation in a second portion on the surface of the body of the controller. A second set of sensors are disposed under the second input surface for detecting movement of the finger of the user over the second input surface. Processing circuitry of the controller is used to analyze the movement of the finger of the user over the first input surface, the second input surface and transmit signals that are used by the interactive application to drive interaction within the interactive application. The controller further includes illumination circuitry with a plurality of illumination elements. The illumination circuitry is coupled to the processing circuitry to obtain illumination feedback data and provide visual feedback in response to the touch input detected at the first input surface, the second input surface.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 1A illustrates a simple block diagram of a gaming system using an improved controller with an input surface to receive touch input and FIGS. 1A-1 and 1A-2 illustrate top and side view of the input surface, in accordance with one embodiment of the present invention.

FIGS. 2A-2F illustrate various different configuration of input surface with one or more indicators, touch input at the input surface of the controller and a rendition of screen of game play indicating movement of a virtual object as it relates to the touch input at the input surface, in accordance with various embodiments of the invention.

FIGS. 3A-3E, 3F-1, 3F-2 and 3G illustrate the different embodiments for providing indicator on the input surface of a controller, in accordance with the teachings of the present invention.

DETAILED DESCRIPTION

Figure 1B:
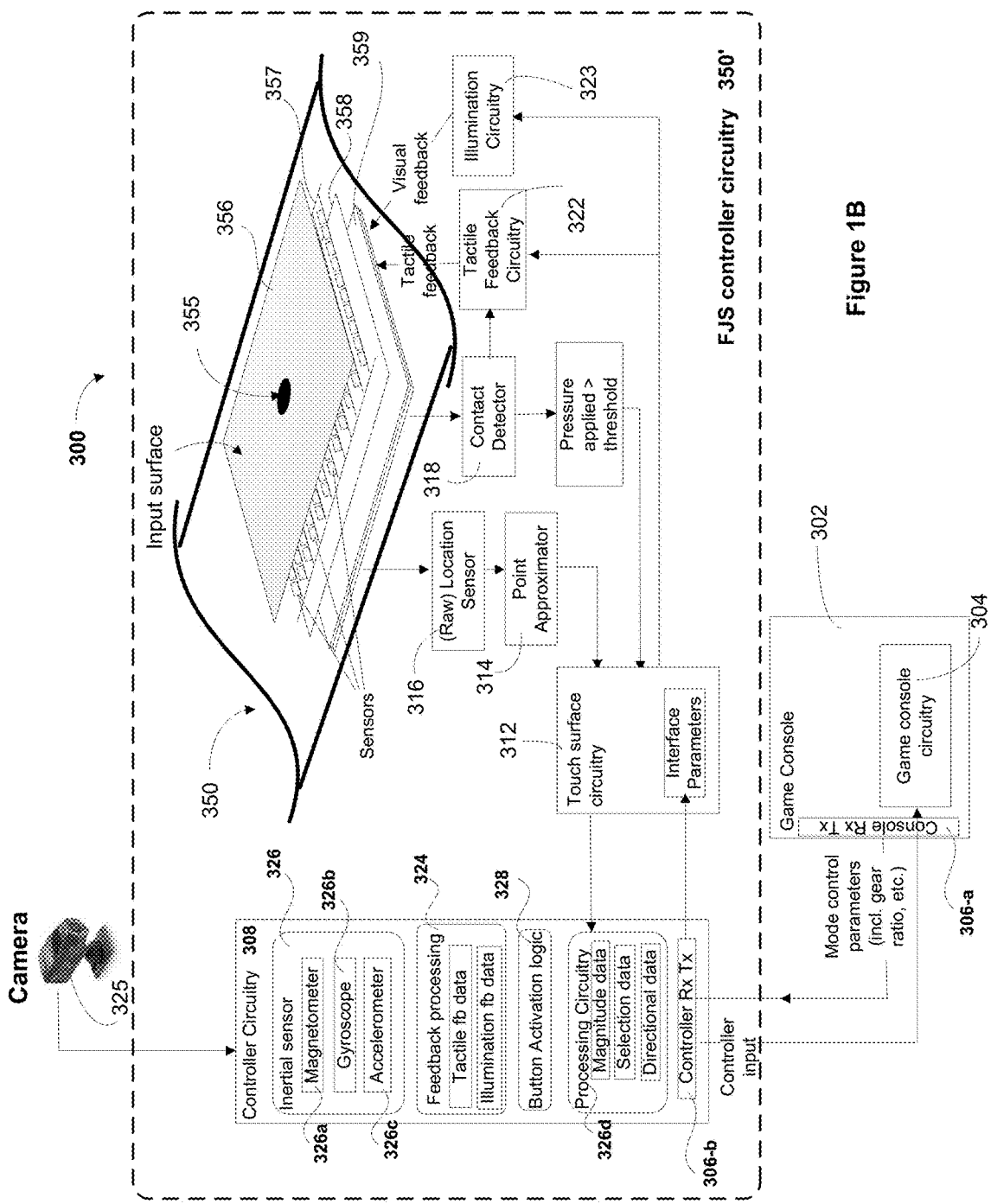
FIG. 1B illustrates a simple block diagram highlighting various modules within the controller used in receiving touch input at an input surface and interacting with a console, in one embodiment of the invention.

Embodiments of the invention disclose a controller for interfacing with a console to control computer generated interactivity for a video game or other communications associated with applications executing at the console. A console, as used in this application, should be broadly construed as a computer. In another example, the computer is a multimedia computing system or entertainment hub that includes an operating system that enables file management and execution of interactive applications, such as video game applications. It should be noted that the interactive applications are not limited to just video game applications but can be extended to a wide variety of other applications, such as web browser, multimedia playback of movies, sound recordings and photos management, online video or text chat, etc.

The console can be a stand-alone device or an internet-dependent device. In the stand-alone device embodiment, the console is capable of storing, executing and rendering an interactive video game without an internet connection. In an internet-dependent device, the console acts as a "client" device (i.e. game client) that is connected over an internet connection to a server processor wherein the server processor is responsible for storing, executing and returning results of the interactive video game to the client device.

A controller, in one embodiment, is a device for interfacing with the console and is defined for movement in a three-dimensional space when held in the hand of a user. The console is configured with console hardware and software to track and recognize the various positions of the controller and correlate the movement to some input, control or action at the video game, feature of the video game, menu associated with the video game or configuration screens provided by an operating system of the console.

The controller, in one embodiment, includes an input surface, such as a touch surface, having a plurality of sensors that enable detection of touch input on the input surface. The controller includes a controller body with a handle and an object disposed at one end of the handle. In one embodiment, the controller body is elongated. The handle of the controller is configured for holding by a single hand of a user. In one embodiment, the input surface is positioned on the handle such that it is proximate to a location of a thumb of the user's single hand, when the controller is held. The touch surface includes an indicator that identifies a reference location on the input surface. The indicator is identified by a surface characteristic on the input surface. The surface characteristic of the indicator, in one embodiment, is a raised (or depressed) object that can be detected through finger-touch. In addition to the indicator, the input surface provides an area for receiving directionality control from a finger of a user and gestures during touch input. In this application, touch surface and input surface are used interchangeably to indicate an input surface that is sensitive to touch and is configured to capture touch input and gestures through finger contact and movement on the input surface. When a touch input is provided at the input surface through interfacing with a finger of a user, the underlying sensors detect the touch input and gestures and transmit data related to gestures and the touch input that is indicative of the directionality control at the touch surface in relation to the defined indicator, to controller circuitry. The transmission of data related to the touch input continues so long as the controller is active and the contact of the finger at the input surface continues.

In one embodiment, in addition to the indicator, the touch surface may also include a plurality of illumination elements disposed thereon. The illumination circuitry is coupled to a processing circuitry of the controller to obtain illumination feedback data so as to provide visual feedback through the plurality of illumination elements, in response to detected touch input. The illumination elements are connected to an illumination circuitry. In one embodiment, the illumination elements may be a series of light emitting diodes (LEDs) disposed at a boundary of the input surface. In this embodiment, portions of the boundary may light up to identify the direction and/or location of the touch input in relation to the indicator on the input surface. In another embodiment, the LEDs may be provided below the input surface covering the entire input surface so that portions of the input surface may light up when the touch input is detected. Additionally, different colored LEDs may be provided to relate to different types of input. For instance, a green color may indicate activation of the controller for accepting touch input and red color may indicate deactivation of the controller. Activation and deactivation of controller will be discussed in more detail with reference to FIG. 1B.

In one embodiment, the touch input is provided by a user's finger touching/pressing on the input surface, and the user can provide directional data input in relation to the indicator by sliding and/or pressing on the input surface, which is similar to the input provided by a joystick of a controller. The sensors associated with the input surface are configured to detect and capture the raw input data from the touch input, interpret the raw input data and transmit the interpreted input data to the controller circuitry. The controller circuitry disposed in the body of the controller is configured to receive the input data that indicates directionality control of the finger touch on the input surface, analyze and interpret the input data from the input surface using one or more hardware and software modules to identify various attributes of the touch input. The input surface is a smooth substrate surface that is configured to receive the finger of the user and allow the finger to slide on the smooth substrate surface. The sliding of the finger across the smooth surface of the input surface provides directionality control that is oriented with reference to the indicator defined on the input surface. Some of the attributes that may be identified by the controller circuitry include one or more of activation/deactivation of the controller, activation/deactivation of a command, location of the touch input with reference to the indicator, resident time at the location, direction of the touch input, acceleration of the finger sliding on the input surface, amount of pressure applied at a particular location, engaging/releasing of the finger defining the touch input, etc. The various data attributes of the input data is transmitted by the controller circuitry as controller input through a communication interface to console circuitry within the console for further processing. The console circuitry uses a plurality of hardware and software modules to process the data received from the controller and to correlate the data into commands and/or control of feature, system setting, an aspect of an application executing at the console, control of a particular object, such as a virtual object, within a video game application, or an action by an application executing at the console.

The console, in turn, may transmit mode control and game settings for the particular application, such as the video game application, to the controller circuitry through the communication interface so as to define game setting or interface parameters for the video game executing on the console. In one embodiment, such setting parameters may be transmitted during initial login/activation of the video game, such as video game play, so that touch input provided at the input surface may be interpreted within the scope of the application based on the interface parameters. The setting parameters may also be transmitted during the execution of the application based on game status.

FIG. 1A illustrates a simplified block diagram of a system used for executing an application, such as a video game application, of the current invention. The system includes a controller having an input surface that is used in providing touch input to control a feature of the application, such as a virtual object in the game play of the video game. Broadly speaking, the system includes a console 302 with a console circuitry 304 and a controller 300 with a flat joystick (FJS) controller circuitry 308 contained therein. Although the term "joy stick" is used, the FJS is not a stick, and instead is a substantially flat surface. The functionality provided by the flat surface, however, provides more control to a user for precision movements. This is especially important when the user is moving the controller in three-dimensional space during interactive play or actions.

Figure 2A:
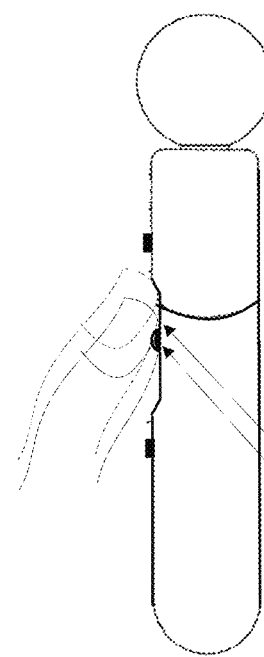

The input surface of the controller 300, in one embodiment, a touch surface with an input area to receive a user's touch input through finger touch on the touch surface and through sliding of the finger across the touch surface. The controller includes a body with an elongated handle and an object is disposed at one end of the handle. The touch surface is provided on one side of the handle and includes an indicator disposed on the touch surface with surface characteristic. The touch and sliding of the finger defines directional control of the user's touch input. The handle also includes a plurality of buttons for providing user input to the console circuitry 304, as illustrated in FIG. 2A. A user interacts with the console through the controller to control interactivity, graphics, media, feature, etc., of an application executing at the console. In one embodiment, the controller communicates with console 302 through controller communication interface 306-*b* and console communication interface 306-*a* using a radio communication protocol such as, but not limited to Bluetooth or one of the protocols defined within the IEEE 802.11 specification (WiFi), or other wireless protocols.

The console configured for implementing a controller may include a processor; a memory unit; a graphics unit with a dedicated video random access memory (VRAM) unit; and an I/O bridge. The console may also comprise an optical disk reader for reading from a hard disk, solid state memory storage, a removable hard disk drive (HDD), etc., and can be made accessible through the I/O bridge. Optionally, the console includes a memory card reader for reading compact flash memory cards, and the like, which is similarly accessible through the I/O bridge. The I/O bridge would handle all wireless, USB and Ethernet data, including data from one or more controllers 300.

The wireless, USB and Ethernet ports also provide connectivity for other peripheral devices in addition to controllers, such as a remote control, a keyboard, a mouse, a portable entertainment device (i.e. Sony Playstation Portable® entertainment device), a video camera, and a microphone headset. The console system may also be compatible with other peripheral devices such as digital video recorders (DVRs), set-top boxes, digital cameras, portable media players, Voice over IP telephones, mobile telephones, printers, scanners, etc. The peripheral devices may be connected to the system unit wirelessly. The remote control is configured to communicate wirelessly with the console system and with some of the peripheral devices to operate and navigate data content.

In one embodiment, console system may use storage to save status of application executing on the console, such as game status for multiple games, customized settings for individual games, and general settings, such as game setting parameters and mode settings and control, for the client. Game status may also be saved on cloud based storage, through internet links, and the like. The controller, in one embodiment, is configured to communicate wirelessly with the console system via the Bluetooth link. The wireless communication using Bluetooth link is exemplary and should not be considered restrictive. Accordingly, other forms of wireless communication may be used in communication between the console and the controller.

In one embodiment, the controller includes a controller circuitry 308 and an input surface to receive touch input. The controller circuitry 308 may also include memory, a processor, a memory card reader, permanent memory such as flash memory, microphone and speaker for ultrasound communications, an acoustic chamber, a digital camera, an internal clock, wireless communications using protocols such as Bluetooth®, WiFi™, etc., inertial sensors module, button activation logic and controller communication interface 306-*b*, to name a few. In addition, the controller circuitry includes illumination circuitry with LEDs, infrared lights or Liquid Crystal Displays (LCDs), touch surface circuitry module and a feedback processing module The input surface of the controller includes an indicator 355 identifying a reference location. The indicator has a surface characteristic, such as a raised surface bump or depressed surface region, or one or more surface textures, curvatures, dents, etc. In one embodiment, the indicator 355 identifies a default location and the touch input on the input surface is computed in relation to the default location. The default location can be understood as a rest or starting position.

The controller circuitry 308 may, in one embodiment, include processing circuitry 326d that interacts with a Touch Surface Circuitry 312 to receive touch input data from the input surface, analyzes and interprets the touch input data using a processor to generate controller input. In one embodiment, the touch surface circuitry 312 may be integrated into the processing circuitry 326d. The processing circuitry 326d analyzes the touch input data received from the input surface to detect one or more of directional data, magnitude data and selection data based on mode control and game setting parameters, and to generate controller input. The controller input is transmitted to the console circuitry 304 through the controller communication interface 306-b and console communication interface 306-a where the controller input data is used to manage and control a virtual world object, feature, system setting, action or other aspects of an application executing on the console 302, such as cursor management, operating system navigation, video playback, audio playback, etc.

In one embodiment, the controller may include one or more inertial sensors 326, which may provide position and/or orientation information to a processor via an inertial signal. Orientation information may include angular information such as a tilt, roll or yaw of the controller. As noted above, and by way of example, the inertial sensors 326 may include any number and/or combination of accelerometers, gyroscopes or tilt sensors. In one embodiment, the inertial sensors 326 include tilt sensors adapted to sense orientation of the controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the controller. Such techniques may be implemented by instructions from the game program or general program, which may be stored in memory and executed by a processor.

By way of example an accelerometer suitable as an inertial sensor may be a simple mass elastically coupled at three or four points to a frame, e.g., by springs. Pitch and roll axes lie in a plane that intersects the frame, which is mounted to the joystick controller. As the frame (and the controller) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

The inertial sensors 326, in one embodiment, are configured to track various data related to movement of the controller in three-dimensional space captured using the object and transmit such data to the console circuitry. The inertial sensors use the gyroscope, magnetometer and accelerometer contained within the controller to interpret the data captured using the object based on the mode control and game setting parameters, to generate six-axis data related to the movement of the controller and transmit the generated data to the console for control of an object or an aspect/feature of the executing application.

Feedback from the console circuitry and the controller circuitry is transmitted to the input surface of the controller through the feedback processing module 324. For instance, the console circuitry 304 transmits mode control and game setting parameters (otherwise termed interface parameters) associated with the application executing at the console, to the controller through the respective communication interface (306-a and 306-b). The console circuitry may also transmit feedback from the application in response to the touch input at the controller. The feedback processing module 324 receives the mode control and game setting parameters from the console circuitry, and interprets the touch input data received from the input surface to provide tactile feedback data and/or illumination feedback data to the input surface of the controller based on the mode control and game setting parameters, in response to the touch input at the input surface.

Continuing to refer to FIG. 1A, the plurality of buttons on the handle of the controller may include graphically designated buttons, such as a square button B1, a triangle button B2, an "X" button B3 and a circle button B4, that are mapped to control various aspects of input for the application executing on the console. The button activation logic 328 detects activation/deactivation of the various buttons at the controller, interprets the input from the various buttons, and transmits the input to the console circuitry through the controller communication interface.

Figure 3A:
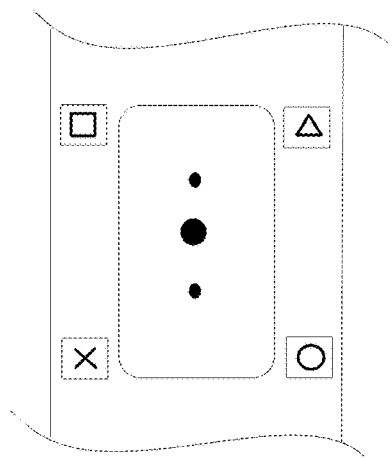
Figure 3B:
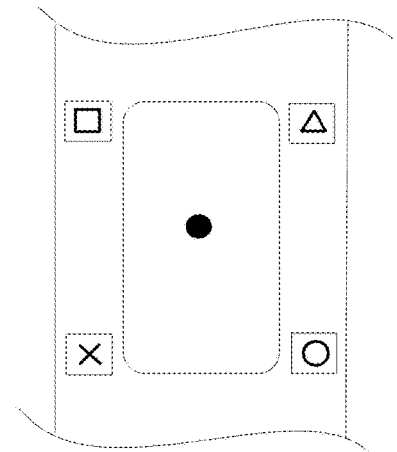
Figure 3C:
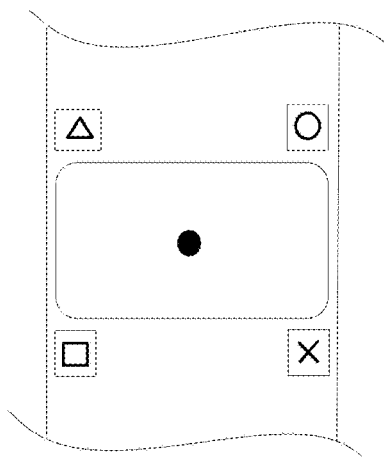
Figure 3D:
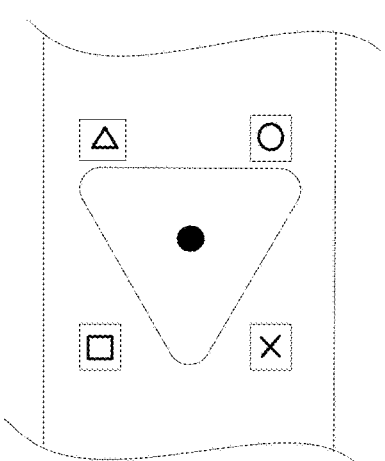
Figure 3E:
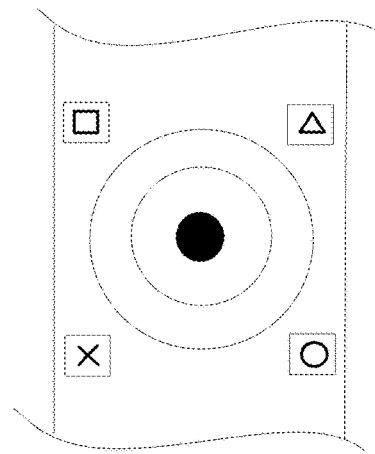
Figures 1, 3F:
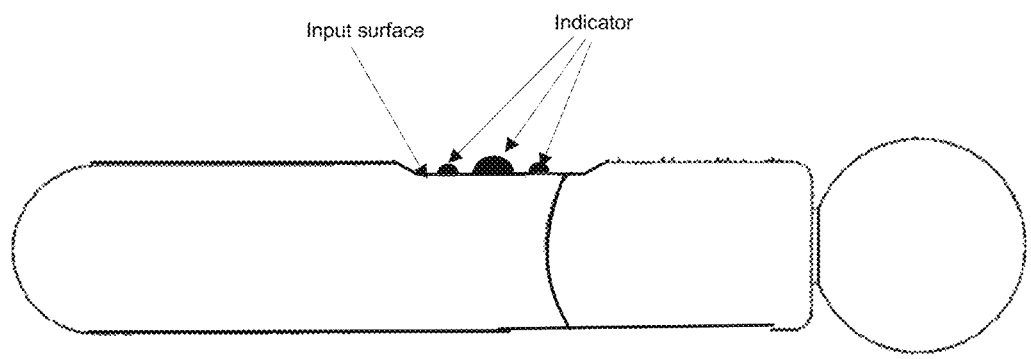
Figures 2, 3F:
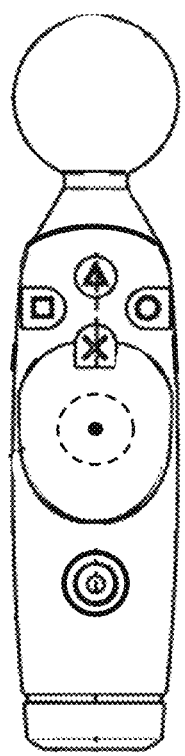
Figure 3G:
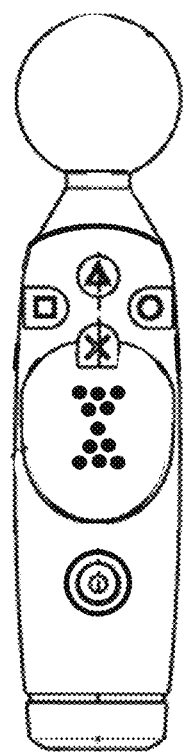

FIG. 1A-1 illustrates a top view and FIG. 1A-2 illustrates a side view of an exemplary controller's handle, in one embodiment of the invention. The controller illustrated in FIGS. 1A-1 and 1A-2 includes an input surface (i.e. touch surface) with an indicator 355 defined on the input surface for identifying a reference location on the input surface. The controller also includes a plurality of input buttons, B1, B2, B3 and B4 that may be used to provide input to different aspect of the application.

FIG. 1B illustrates details of the controller and the controller circuitry used to communicate with the console circuitry of a system, such as a game system. The game system is similar to the system illustrated in FIG. 1A and includes a console 302 with a console circuitry 304, a communication interface 306 comprising a console communication interface portion 306-a and a controller communication interface portion 306-b, a camera 325 to capture the various moves of a controller 300 in three-dimensional space, the controller 300 with a flat joystick (FJS) controller circuitry 308 contained therein, and a monitor (not shown).

In one embodiment, the monitor is a television or display screen that is also capable of reproducing or rendering audio and video output from the console 304. A user interacts with the console using the controller 300 to control interactivity, graphics, media, etc., that is displayed on the monitor associated with the console. The controller 300 communicates with console 302 using a radio communication protocol such as, Bluetooth or one of the protocols defined within the IEEE 802.11 specification. The current embodiments are explained in detail with the console interacting with a single controller. However, the console is not restricted to receiving touch input from a single controller. Rather, the console 302 is capable of receiving and processing touch input from multiple controllers manipulated by multiple users.

In one embodiment, the game system includes a game server (not shown) and the console 302 is communicatively connected to the game server. In one embodiment, the game server acts as a primary executing processor and the console acts as a secondary executing processor. In this embodiment, the game application or any other application may be executing on the game server and the console provides a secondary processor for additional processing of the input. In another embodiment, the game server acts as a secondary executing processor with the primary executing processor residing on the console.

The system architecture of the console is similar to a Sony® Playstation 3® entertainment device. The console may be compatible for implementing a controller, in accordance with one embodiment of the invention. The overall system architecture of the Sony® Playstation 3® entertainment device may include a console system unit with various peripheral devices connectable to the system unit. The system unit may comprise a Cell processor; a dynamic random access memory unit; a Reality Synthesizer graphics unit with a dedicated video random access memory (VRAM) unit; and an I/O bridge. The system unit may also comprise a Blu Ray® Disk BD-ROM® optical disk reader for reading from a disk and a removable slot-in hard disk drive (HDD), accessible through the I/O bridge. Optionally the system unit may also comprise a memory card reader for reading compact flash memory cards, Memory Stick® memory cards and the like, which is similarly accessible through the I/O bridge.

The I/O bridge may also connect to a plurality of Universal Serial Bus (USB) ports; an Ethernet port; an IEEE 802.11b/g wireless network (Wi-Fi) port; and a Bluetooth® wireless link port capable of supporting a plurality of Bluetooth connections. In operation, the I/O bridge would handle all wireless, USB and Ethernet data, including data from one or more controllers. For example when a user is playing a game, the I/O bridge receives data from the controller via a Bluetooth link and direct it to the Cell processor, which updates the current state of the game based on the data received from the controller.

The wireless, USB and Ethernet ports also provide connectivity for other peripheral devices in addition to controllers, such as a remote control, a keyboard, a mouse, a portable entertainment device (i.e. Sony Playstation Portable® entertainment device), a video camera, and a microphone headset. Such peripheral devices may be connected to the system unit wirelessly. The console system may also be compatible with other peripheral devices such as digital video recorders (DVRs), set-top boxes, digital cameras, portable media players, Voice over IP telephones, mobile telephones, printers, scanners, etc. Additionally, legacy memory card readers may be connected to the console system via USB port, enabling the reading of memory cards of the kind used by Playstation® or Playstation 2® devices. The remote control is configured to communicate wirelessly with the console system and with some of the peripheral devices to operate and navigate data content. Data communication with the peripheral devices is enabled through a device driver contained within the console system.

In one embodiment where the console system acts as a standalone game client device, the game client is capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver. In the embodiment where the console system acts as a game client device interacting with applications executing on a server, the game client is capable of allowing users to connect to server applications and processing input for the application via the internet. The game client allows users to access and playback online entertainment content such as but not limited to games, movies, music and photos. Additionally, the game client can provide access to online communications applications such as VOIP, text chat protocols, and email. When a game client connects to a server processing module, user session control may be used to authenticate the user. An authenticated user can have associated virtualized distributed storage and virtualized network processing. In this embodiment, console system may use distributed storage to save game status for multiple games, customized settings for individual games, and general settings, such as game setting parameters and mode control, for the game client.

The controller, in one embodiment, is configured to communicate wirelessly with the console system via the Bluetooth link. However, the controller is not restricted to communication via the Bluetooth but may instead be connected to a USB port. The USB port also enables providing power by which to charge battery of the controller. The controller includes a controller circuitry 308 and an input surface, such as touch surface, to receive touch input. In one embodiment, controller circuitry is similar to the controller circuitry described with reference to FIG. 1A and includes one or more of memory, a processor, a memory card reader, permanent memory such as flash memory, illumination circuitry with LEDs, infrared lights or use liquid crystal displays, microphone and speaker for ultrasound communications, an acoustic chamber, a digital camera, an internal clock, wireless communication interfaces using protocols such as Bluetooth®, WiFi™, etc., touch surface circuitry module, feedback processing module, inertial sensors module, button activation logic and controller communication interface 306-*b*, to name a few. The above list is not exhaustive and should be considered exemplary. Additional or fewer modules may be provided within the controller to detect, capture, and process touch input at the input surface.

The controller circuitry 308 interacts with the input surface of the controller 350 to detect and capture raw touch input data and transmits the data to the console. The input surface of the controller includes an indicator 355 identifying a reference location. The controller may also include a plurality of buttons for providing application related user input, as illustrated in FIG. 2A. In one embodiment, the plurality of buttons includes graphically designated buttons that are mapped to control various functional aspects of input at the application executing at the console. For example, in one embodiment, an "X" button may be mapped to select a highlighted item rendered on the display screen. In another embodiment, the "X button may be used to initiate a kick action in a fighting game, fire a weapon in a first person shooter or activate an application. The other buttons on the input controller can be similarly mapped to perform various functions within interactive video games or other aspects of an application executing at the console.

The controller circuitry 308 includes various hardware/software modules that receive, analyze and interpret the data from the controller. The data from the controller includes touch input data obtained from the input surface, data related to orientation of the controller as captured by the camera 325 and data from the one or more buttons available at the controller. The touch input from the input surface is received and processed through the touch surface circuitry 312, which interacts with a location sensor 316 to determine a general area of touch input in relation to the indicator disposed on the input surface; a point approximator 314 to pinpoint and compute the coordinates of specific location(s) of the touch input at the input surface; and a contact detector 318 to detect the touch input and a magnitude of pressure provided by the touch input at a given location. A feedback circuitry 324 in the controller circuitry includes a tactile feedback circuitry to provide tactile feedback data to the controller and an illumination circuitry to provide illumination feedback data at the input surface of the controller in response to the touch input provided at the input surface.

The data collected by the touch surface circuitry 312 is processed by a processing circuitry 326d at the controller. In another embodiment, some or all of the raw data is transmitted to the console for processing. The processing circuitry 326d is configured to detect various aspects of the input data collected by the touch surface circuitry 312, such as magnitude data, selection data and directional data associated with the input data, interpret the various aspects of the input data and transmit the information related to the various aspects of input data to the console as controller input.

Still referring to FIG. 1B, the controller circuitry 308 includes hardware and software modules that are configured to receive data from the touch surface, from one or more data buttons available at the controller and from a camera 325 and analyze and interpret the received data. The data from the camera 325 captures orientation data of the controller in three-dimensional space. The captured data from the camera is interpreted by inertial sensor module 326 of the controller circuitry 308 to identify various attributes of the data related to the orientation of the controller, such as six-axis data (i.e. data related to x, y, z axes, pitch, roll and yaw). In one embodiment, the inertial sensor module 326 uses a magnetometer 326a, Gyroscope 326b and an Accelerometer 326c to interpret the input data. The above list of modules used by the inertial sensor module 326 is exemplary and should not be considered restrictive. The magnetometer 326a is used to measure the strength, direction and variations in a magnetic field of the controller and to act as a compass by providing directional data by calibrating controller's orientation as captured by the camera in relation to the Earth's magnetic field. The gyroscope 326b is used to measure rotational velocity associated with the controller with respect to an inertial frame of reference. The accelerometer 326c is used to measure motion of the controller including speed, direction, orientation of the controller (such as landscape or portrait orientation of the input surface), stabilization of controller, etc., while interpreting the rate of change of speed registered by the movement of the controller in three-dimensional space. The controller circuitry 308 may interact with other modules, such as a global positioning system (GPS), to accurately determine geo-location of the controller. At least some of the data related to the position, rotation, stabilization, orientation, speed of the controller are detected and provided by the camera 325, in one embodiment.

Along similar lines, data from one or more buttons available at the controller is analyzed by the button activation logic 328 within the controller circuitry 308 to identify one or more attributes of the data. The one or more attributes define input to one or more functions of the application executing on the console. The button activation logic 328 processes the data obtained from the controller to identify activation/deactivation of one or more buttons and to provide appropriate input for generating controller input.

The controller circuitry 308 gathers data from the various modules (326a-326d and 328) and generates controller input, which is transmitted to the console circuitry 304 through respective communication interfaces 306-a and 306-b. The console circuitry 304 includes logic within to enable the console to interpret the controller input data and to correlate to commands and control of an application executing at the console. For instance, the console circuitry 304 may compute a new position of a virtual object within a video game application in relation to the game play using the controller input data received from the controller based on knowledge of previous location of the virtual object.

The console circuitry 304, in turn, provides mode control and application setting parameters (i.e. interface parameters) related to the specific application executing at the console, such as a video gaming application, to the controller circuitry 308 through the respective communication interfaces 306-a and 306-b. In one embodiment, the application interface parameters may include the turn sensitivity, gearing ratio, etc., as related to a gaming application. For instance, in a car racing game, the application setting parameters may indicate how fast and how much the wheels can turn, etc. For more information on gearing, reference can be made to application Ser. No. 11/382,036, entitled "Method and System for Applying Gearing Effects to Visual Tracking", filed on May 6, 2006, and which is herein incorporated by reference.

The application setting parameters may also control the magnitude associated with various positions on a game surface and correlate to different locations on the input surface as it relates to the touch input. Additionally, the application setting parameters may specify parameters for activating/deactivating input surface for receiving touch input, in one embodiment of the invention. The parameters for activating/deactivating the input surface to receive touch input may specify a pressure threshold, location where such pressure has to be applied, number of times such pressure has to be applied at the input surface at or near the location during activation/deactivation, etc. For example, when a user provides finger touch on the input surface at a location where the indicator is provided, the contact detector measures the magnitude of pressure applied at the input surface at the indicator location and compares the location and magnitude of the applied pressure against the specified location and pressure threshold defined in the application setting parameters. If the applied pressure is above the specified threshold and is at the location detailed in the setting parameters, the input surface is activated to receive touch input. Similarly, once activated, the same pressure threshold may be used to deactivate the touch input at the input surface. However, once activated, the location for applying the pressure to deactivate the input surface may be specified in the setting parameters to be any location on the input surface including the indicator location. Thus, every game or application executing on the console will interface with the controller circuitry to share certain established application setting parameters.

In addition to activating/deactivating the input surface to receive touch input, the mode control and setting parameters specified for the application, such as gaming application, may enable the controller circuitry to activate or deactivate some of the motions allowed at the controller. Thus, the console can interface with the controller to change the mode of operation of the input surface of the controller (i.e. Flat Joy Stick input surface) according to the mode control parameters. For instance, in one embodiment, the mode control may be used to turn off (i.e. deactivate) the FJS input surface altogether during a particular state of the game, and then turn it back on (i.e. activate) during a different state of the game. In one embodiment, the mode control and game setting parameters may be defined during initialization of an application and can be dynamically refined during the game play based on the game state.

Continuing to refer to FIG. 1B, the input surface of the controller may be made up of a plurality of layers to detect and transmit raw touch input provided at the input surface. By way of example only, and not limited to the actual example, FIG. 1B illustrates a cross-section of a portion of the controller identifying various layers that may define an input surface. In one embodiment, the input surface may be made of a glass (or plastic) substrate layer 358 that may use any one of resistive, capacitive, surface acoustic wave technology or any other known technology to recognize the touch input at the input surface. Depending on the technology used, the glass substrate layer 358 may be covered by a layer of any one of capacitive material, conductive and resistive material or transducers to detect and measure the change in electrical charge/circuits resistance/changes in vibration caused by the touch input. The rate of such changes and locations are accurately measured using the aforementioned hardware and software of the controller circuitry. For instance, when capacitive materials are used over the glass substrate layer 358, the capacitors are arranged in a grid format with each point or node on the grid identifying a distinct location on the input surface. In this embodiment, the grid of capacitors form the sensor grid layer 357 with a plurality of sensors that detect change in the current at each node. In one embodiment, the glass substrate layer 358 may be a solid color surface. In another embodiment, the input surface can change colors.

In order to provide visual feedback at the controller, the sensor layer may be coupled to an illumination circuitry, in one embodiment. In this embodiment, a layer of liquid crystal display (LCD) 359 may be provided at the underside of the glass substrate layer 358 and connected to the illumination circuitry so that LCD layer 359 can provide different colors to illuminate the glass substrate layer 358 of the input surface based on the touch input. In one embodiment, the LCD layer 359 can also render different graphical images and icons to provide information back to the user when the user is interfacing with the input surface.

In one embodiment, in place of the LCD layer 359, an illumination layer composed of a plurality of illumination elements may be provided at the underside of the glass substrate layer 358 and connected to an illumination circuitry to enable the input surface to light up and change colors based on touch input detected at the input surface. In this embodiment, the plurality of illumination elements may include light emitting diodes (LEDs) or other similar illumination elements. The LEDs may be disposed to cover the entire input surface or just disposed at an edge/boundary of the input surface or a combination of both. Thus, depending on the way LEDs are disposed, LEDs may be used to light a particular portion of the input surface or a portion of the boundary of the input surface or a combination of both thereby providing a visual feedback to the user for the input provided at the input surface.

In addition, light sources may provide telemetry signals to the processor, e.g., in pulse code, amplitude modulation or frequency modulation format. Such telemetry signals may indicate which buttons are being pressed and/or how hard such buttons are being pressed. Telemetry signals may be encoded into the optical signal, e.g., by pulse coding, pulse width modulation, frequency modulation or light intensity (amplitude) modulation. The processor may decode the telemetry signal from the optical signal and execute a game command in response to the decoded telemetry signal. Telemetry signals may be decoded from analysis of images of the joystick controller obtained by an image capture unit. Alternatively, an apparatus may include a separate optical sensor dedicated to receiving telemetry signals from the lights sources.

A processor may use inertial signals from the inertial sensor in conjunction with optical signals from light sources detected by an image capture unit and/or sound source location and characterization information from acoustic signals detected by a microphone array to deduce information on the location and/or orientation of a controller and/or its user. For example, "acoustic radar" sound source location and characterization may be used in conjunction with a microphone array to track a moving voice while motion of the joystick controller is independently tracked (through inertial sensors and or light sources). In acoustic radar, a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit.

In order to provide sensory feedback at the controller, the sensor layer may be coupled to a tactile feedback circuitry 322, in one embodiment. The tactile feedback circuitry may be equipped with "haptic" technology that is designed to measure the magnitude of pressure applied at a particular location on the input surface and translate it to appropriate tactile feedback at the controller based on the game setting parameters. The haptic technology is designed to provide sensory feedback to the user. In one embodiment, the haptic technology may engage microfluid technology. The microfluid technology allows a user to alter the input surface while providing user input. The technology provides a set of predefined buttons that can be used to raise or lower in predefined locations and create a basic pattern on the controller device. In one embodiment, the microfluid technology may be used to physically change the indicator's reference location for user input or change the pattern on the input surface.

When a user provides finger touch input at the indicator, the location sensor 316 and the contact detector 318 connected to the sensor layer 357 detect the touch input at the indicator on the input surface and analyze the touch input to identify input features (i.e. input attributes), such as location, magnitude of pressure applied at the location, etc. The input features of the touch input are transmitted to the touch surface circuitry 312 where it is analyzed. The analyzed touch input is transmitted to the processing circuitry where the data is interpreted and a controller input is generated. The controller input is forwarded to the console circuitry 304 where it is correlated to control of virtual object, feature, system setting, action or aspect of an application executing at the console.

The console circuitry may return a feedback in response to the touch input, to the controller circuitry 308. A feedback processing module 324 at the controller circuitry receives the feedback from the console circuitry, interprets the feedback to identify tactile feedback data and illumination feedback data and forwards tactile feedback data to tactile feedback circuitry 322 and/or illumination feedback data to illumination circuitry 323. The tactile feedback circuitry provides necessary tactile feedback at the controller based on the tactile feedback data received from the feedback processing module of the controller circuitry. The tactile feedback provides a sensory response to the touch input at the controller. In one embodiment, the tactile feedback may be accompanied by an audio feedback.

The illumination circuitry provides illumination feedback (i.e. visual feedback) based on the illumination feedback data obtained from the feedback processing module 324, by activating appropriate illumination elements, such as the LEDs, disposed at the input surface. The illumination feedback data is in response to the touch input provided in relation to the indicator on the input surface of the controller. The illumination elements are configured to light up either in a single, solid color or different colors to correlate with the user's input. For instance, the illumination elements disposed at the input surface may display a red color initially when a touch input is detected at the input surface and the magnitude of pressure specified in the touch input is less than a threshold value. Along similar lines, the illumination elements may display a green color when the pressure specified in the touch input at the input surface exceeds a pre-defined threshold value. In one embodiment, the intensity of light from the illumination elements and the amount of tactile feedback returned to the controller are based on the amount of pressure applied in the touch input.

Figure 6:
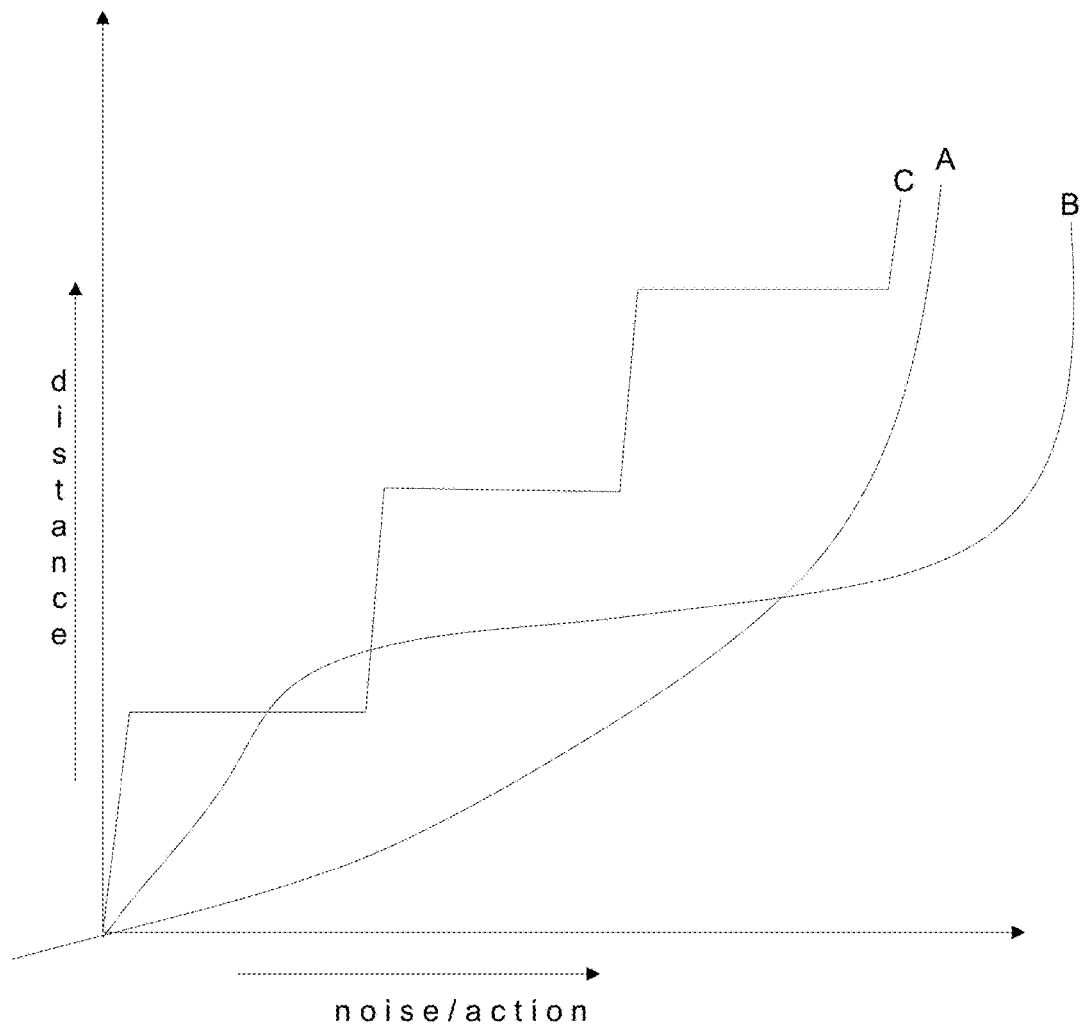
FIG. 6 illustrates an exemplary graph of noise/action over distance as it relates to touch input at the input device, in one embodiment of the invention.

FIG. 6 illustrates a graph that graphically identifies the relationship between distance from the indicator and the noise provided at the controller by the tactile circuitry in response to the touch input, in one embodiment of the invention. For example, consider an input received from a user at the input surface. A user provides finger touch on the input surface at the indicator location and glides his finger across the input surface. Depending on the amount of pressure applied, the speed with which the user's finger glides across the input surface, and the distance of the finger from the indicator, the tactile circuitry provides the appropriate tactile feedback at the controller. As illustrated by line A, as the user's finger steadily moves away from the indicator location, the amount of tactile feedback provided at the controller increases steadily. Line B illustrates an alternate scenario wherein the user's finger initially moves slowly across the input surface and gradually increases in speed and distance and the tactile feedback reflects such input by first providing a steady noise and gradually increasing the intensity of the noise at the controller to reflect the change in speed and distance. Similarly line C illustrates a different scenario wherein the touch input increases in intervals and the noise provided in the tactile feedback from the tactile circuitry is reflective of the touch input. The noise provided by the tactile circuitry may be in the form of audio feedback and/or tactile feedback. In another embodiment, the noise may just be represented as raw data that is transmitted to the console for processing.

In one embodiment, the touch input provided at the input surface may be used to activate or deactivate the controller, depending on mode setting associated with a particular application executing at the console. According to this embodiment, when the pressure applied by the touch input exceeds the threshold value, the controller may be activated and the activation may be communicated visually to the user by displaying the illumination elements in green color or sensory with a tactile feedback or a combination of both visual and sensory communication. Once activated, when similar pressure is applied at the input surface through a subsequent touch input, the controller may be deactivated and such action may be accompanied with a display of a red color, another tactile feedback corresponding to the touch input or a combination of both. In one embodiment, the activation may be performed by the user providing sufficient pressure at the indicator location and the deactivation may be performed by the user providing equivalent pressure at any location on the input surface including the indicator location. The above embodiments are exemplary and should not be considered restrictive. Other combinations or means of communicating activation/deactivation may be employed as deemed fit.

Still referring to FIG. 1B, a flexible and transparent protective layer 356 (or simply, a protective layer) may be used to cover the sensor grid layer 357. During touch input, when a user presses down, due to the flexible nature of the protective layer 356, the protective layer 356 is pushed down and when the user releases the pressure, the protective layer 356 returns back to its original position. The pressing and releasing of the protective layer 356 is detected using the sensor layer and recorded as raw data by the Touch surface circuitry 312. The processing circuitry of the controller interacts with the touch surface circuitry 312 to determine the magnitude and location of the pressure applied by the touch input, the subsequent release of the pressure at the location and translates it, in one embodiment, to activation/deactivation of the input surface for receiving touch input. Once the input surface is activated to receive touch input, when a user releases his finger from the input surface, the touch surface circuitry detects releasing of the user's finger from the input surface through the sensor grid layer 357 and transmits this information to the processing circuitry. The processing circuitry interprets the release of the finger from the input surface and provides feedback data to the input surface to return/reset the input location for receiving subsequent touch input to a default location so that subsequent touch inputs start from the default location. In one embodiment, the default location is the location where the indicator is disposed.

FIGS. 2A-2F illustrate how the controller circuitry, with the help of the underlying sensors at the sensor grid layer 357, detects the different locations where the user's finger is pressed/released in relation to an indicator 355 during user engagement/disengagement at the input surface, and correlates the touch input to appropriate actions in a game play at the console. A touch input is received at the input surface where an indicator, such as a raised, finger-touchable dimple or dot, is disposed to define a reference location, such as a center of the input surface. A user providing touch input at the input surface first identifies a reference location, such as a center of the input surface, by detecting the indicator, presses down and moves his finger along the input surface in a specific direction. The underlying sensor grid layer detects the initial press, which identifies user engagement at the input surface, and the subsequent directionality control provided by the user's finger touch. The location sensor together with the contact detector within the controller detects the user's finger press/move on the input surface and the magnitude of pressure applied at various locations of the input surface. The location sensor/contact detector uses this information to first determine activation of the input surface by identifying input attributes of the touch input and verifying the input attributes against a threshold value. Upon successful verification, the sensor/detector pinpoints the different locations that user's finger moved in relation to the indicator using location approximation. The location approximation technology works in the following manner Raw data from user's input is transmitted to point approximator 314 for analysis. The point approximator 314 pinpoints specific locations of the touch input by first identifying a wide area on the input surface where the user pressed his finger and pinpoints a specific location within the wide area based on the magnitude of pressure sensed at various locations within the wide area using process of elimination. Thus, the location sensor, contact detector and point approximator work together to pinpoint each of the various locations, magnitude and selection as related to the user's finger touch and movement on the input surface.

The setting parameters received from the console are used to determine various input threshold so as to correlate the touch input data at the input surface to the game area in the game play. For example, when a user moves his finger on the input surface from the location of the indicator toward an edge of the input surface, the magnitude of displacement is larger than if the user presses at the indicator and moves his finger along the input surface away from but closer to the indicator. In another instance, when a user moves his finger on the input surface slowly from the indicator toward an edge of the input surface in a particular direction, the controller circuitry using the location sensor, point approximator and contact detector (collectively termed "modules") detects, receives and interprets the input data such that the virtual object can be moved in an equivalent manner to a related location in the game area of the game play. When a user presses on the indicator and quickly swipes his finger along the input surface away from the indicator toward an edge of the input surface in a particular direction, the modules within the controller circuitry may interpret such swipe to correlate to the acceleration of the virtual object in the particular direction within the game play. The modules in the controller circuitry, thus identify some of the attributes of the touch input, such as the selection, direction, magnitude of displacement, acceleration, and pressure applied by the touch input in relation to the indicator, and translate the attributes of the touch input data to appropriate actions at the virtual game application.

The controller circuitry, for instance, may interpret the touch input at different locations on the input surface by defining magnitude of displacement as a percentage of distance relative to the indicator on the input surface in a particular direction and convert this percentage of distance to an equivalent movement of the virtual object in a game surface of the game play. Thus, if the user presses his finger at the indicator and quickly swipes his finger upwards towards the edge and stops just shy of the boundary, the controller circuitry may interpret this movement to moving the game object straight up to about 80% of the distance in the game area of the game play with a distance of 100% movement to mean the boundary of the game area. FIG. 2A-2F illustrates the concept of capturing the touch input at the input surface by the plurality of sensors and correlating it to game movement in a game play executing on a console, in one embodiment.

FIG. 2A illustrates an exemplary controller, such as a move controller, that includes an input surface with an indicator and a plurality of sensors disposed thereon (not shown). User engagement to provide touch input is enabled by the user by pressing his finger at the indicator on the input surface of the controller. The modules within the controller interpret the orientation of the controller in relation to the indicator and interpret subsequent touch input provided at the input surface accordingly. The location of the indicator translates to a reference starting point in the game area of the game play.

Figure 2B:
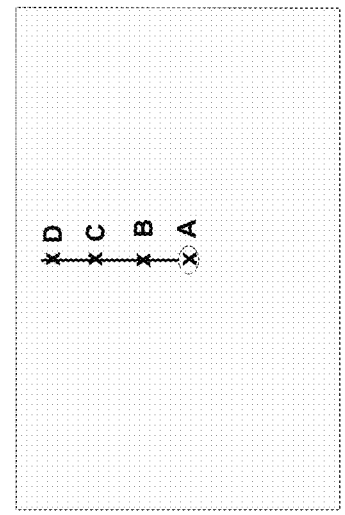
Figure 2C:
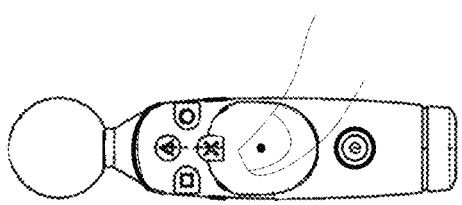
Figure 2D:
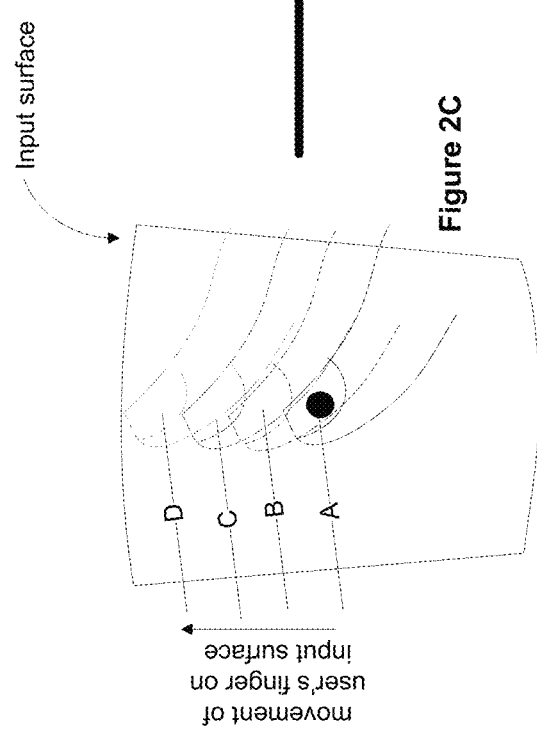

Once the user has detected the center of the input surface, the user can move his finger in any direction on the input surface by moving his finger away from the indicator, as illustrated in FIGS. 2B-2F. The sensors disposed at various points on the input surface will detect the direction in which the user's finger progresses in relation to the indicator and feeds this raw data to the touch surface circuitry. The touch surface circuitry interprets the raw data to generate data points using the game setting parameters (interface parameters) and mode control received from the console. These data points are fed to the controller circuitry so that the controller circuitry can interpret the data points from the touch input to identify one or more attributes of the touch input. As mentioned earlier, the identified attributes may include selection of the data points in relation to the indicator, coordinates of the location of the data points in relation to the indicator, magnitude of pressure applied at each of the data points, resident time at specific data points, direction of the touch input in relation to the indicator, magnitude of displacement, etc. Subsequent movement of the user's finger on the input surface detected and captured by the sensors as data points are illustrated in FIGS. 2B-2D. FIG. 2B illustrates an exemplary movement of a user's finger on the input surface in relation to the indicator. FIG. 2C illustrates relative movement of user's finger over the input surface from the indicator location. As the user's finger glides from the indicator's position at point A to point B, the controller circuitry measures the magnitude of displacement of each of the data points in a specific direction in relation to the indicator at the input surface and correlates to corresponding movement of the virtual object within the game surface of the game play. Thus, as illustrated in FIG. 2C, the user's input from point A to point B may translate to a magnitude of displacement of 25% in an upward direction, from point A to point C about 50% or point B to point C of about 25% in the same direction as from point A to point B and from point A to D about 75% displacement magnitude in the same direction as from point A to points B and C. FIG. 2D illustrates the corresponding location points reflecting the movement of the virtual object in the game area that corresponds to direction of the data points on the touch input and the magnitude of displacement illustrated in FIG. 2C. Thus, the touch input at the input surface are interpreted to identify the attributes of selection, direction, magnitude of movement and applied pressure and these attributes are correlated to corresponding movement/actions in the video game executing on the console. As shown, the user's finger is moved from the center of the input surface where the indicator is disposed to different data points on the input surface and the controller circuitry uses the mode control parameters to relate it to appropriate direction and magnitude when moving the virtual object in the game play.

FIGS. 2B-2D illustrate a simplistic representation of the user's input in a single direction. The increased interactivity at the controller, however, is used to define more realistic control for the applications executing at the console. FIGS. 2E and 2F illustrate a more realistic interpretation of the touch input at the input surface and the control of the virtual game object in a game play as it correlates to the touch input at the input surface of the controller, in one embodiment of the invention. As illustrated in FIG. 2E, a user engaged in providing touch input at the controller may detect the indicator and determine the orientation of the controller. The user may then move his finger on the input surface of the controller in different directions (identified by data points 1', 2', 3', 4', 5', 6' and 7') in relation to the center of the input surface where the indicator is provided (identified by 0'). Based on the movement of the user's finger, the virtual object in the game play is moved. This is indicated in FIG. 2F by the data points having the same reference numerals, for easy identification. The various data points on the game surface are correlated to the touch input at the input surface, as indicated by outward pointing arrows from the center of the game surface to the different data points, wherein the center of the game surface correlates to the center of the input surface where the indicator is disposed. Thus, when a user presses his finger at one of the corners or extremities of the radius wherein the indicator is at the center, the logic within the modules of the controller interprets the input data and correlates to input for the game play by moving the virtual object of the game to corresponding farthest data points on the game surface in the direction of pressing. The input data continues to received and interpreted by the processing circuitry so long as the controller is active and the user provides the touch input at the input surface.

After providing touch input at the input surface for some time, the user may remove his finger from the input surface. The sensor and the logic within the touch surface circuitry detects the removal of the user finger from the input surface and translates it to the release of the touch input at the input surface. As a result, the controller circuitry resets the starting point for subsequent touch input at the input surface of the controller to a default starting point from the location where the touch input was last detected. Thus, in the example illustrated in FIG. 2E, the location where the touch input was last detected was at location indicated by reference numeral 7'. When the controller circuitry detects release of the touch input at the input surface, the starting point for subsequent touch input moves from data point 7' to data point 0' where the indicator is located as indicated by the inbound dotted line 402. The default starting point for the above example is the location where the indicator is disposed on the input surface.

The user may also be able to lock the virtual object in the game play at a particular location by providing sufficient pressure at a desired location on the input surface in relation to the indicator and the underlying logic of the controller circuitry will interpret the touch input to lock the position of the virtual object at the corresponding location in the area of the game play. A subsequent press at any location on the input surface will release the lock held on the virtual object.

FIGS. 3A-3E, 3F-1, 3F-2 and 3G illustrate exemplary input surfaces of the controller for providing touch input. As illustrated in FIG. 3A the input surface of the controller includes an indicator disposed in the center of the input surface with additional indicators disposed on either side of the indicator in equidistant position from the indicator. The controller also includes a set of buttons for providing additional inputs to the application executing at the console. FIG. 3B illustrates an alternate embodiment of a controller surface illustrated in FIG. 3A. In this embodiment, the input surface of the controller includes a single indicator disposed in the center of the input surface. FIG. 3C illustrates an alternate embodiment of a controller illustrated in FIG. 3B, wherein the input surface of the controller has a different orientation than the one illustrated in FIG. 3B. FIG. 3D illustrates yet another embodiment with a triangular shaped input surface with an indicator disposed in the center of the triangular input surface. FIG. 3E illustrates yet another embodiment with the input surface being circular and an indicator disposed in the center of the circle with a plurality of smaller indicators disposed along one or more concentric circles around the central indicator. The input surface and the disposition of the indicator to identify reference location (s) may take different shapes and forms.

In the embodiment illustrated in FIG. 2A, a single indicator is disposed at the center of the input surface area. FIG. 3F-1 illustrates a side view of the embodiment illustrated in FIG. 3A and FIG. 3F-2 illustrates a top view of the embodiment illustrated in 3E. FIG. 3B illustrates an alternate embodiment of a controller illustrated in FIG. 3A wherein a plurality of indicators may be disposed on the input surface in a pattern that enables a user to quickly identify a reference location on the input surface, such as the center of the input surface. In one embodiment, when a plurality of indicators are provided at the input surface, in order to enable the user to easily identify the center of the input surface, the indicator in the center may be configured to be raised higher than the remaining indicators disposed either in one or more concentric circle(s) or on either side of the indicator in the center. As in the previous embodiment, the indicator in the center of the input surface may be raised higher than the remaining indicators in the pattern to enable the user to easily identify the center and determine the orientation of the controller. The input surface may also be configured to provide various types of visual and sensory feedback to the user based on the nature and type of touch input at the input surface.

Figure 4:
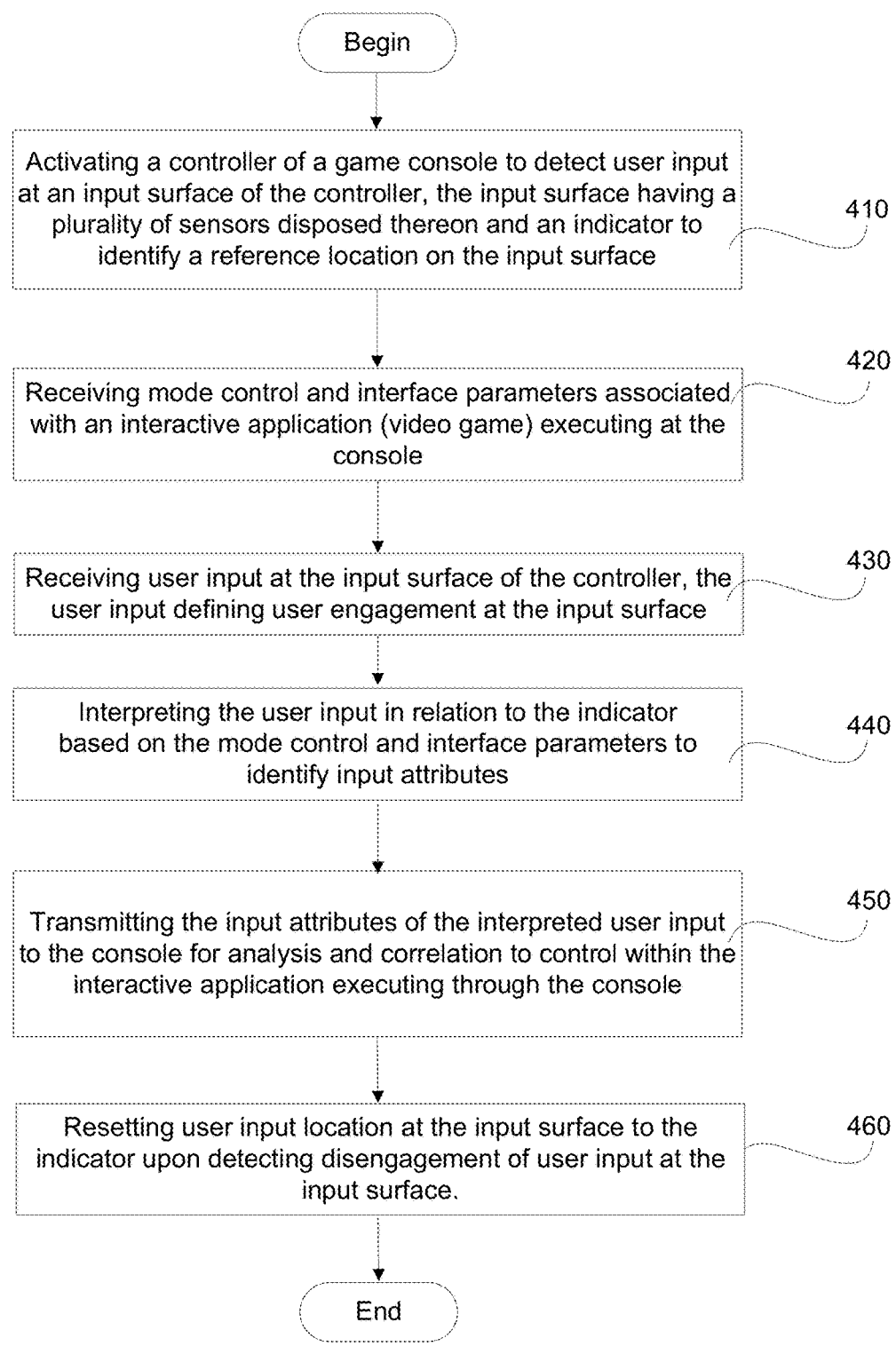
FIG. 4 is an exemplary flow chart that illustrates operation of the controller with an indicator disposed on the input surface, in accordance with one embodiment of the present invention.

With the detailed embodiments of the invention, specific methods will now be described with reference to FIGS. 4 and 5. FIG. 4 is an exemplary flow chart that illustrates various operations to provide touch input to a console executing an interactive application, such as an interactive video game, using a controller, in one embodiment of the invention. The method begins at operation 410 wherein the controller for the console is activated to detect touch input at the input surface. The input surface of the controller includes a plurality of sensors disposed thereon and an indicator is defined on the input surface to identify a reference location on the input surface. In one embodiment, the controller is activated by providing a certain amount of pressure at the location of the indicator on the input surface through finger touch from a user. The location of touch input and amount of pressure applied at the input surface is measured and compared against a pre-determined threshold value. If the amount of pressure applied is greater than the pre-determined threshold value, the controller is activated. Once activated, the controller is ready to receive touch input at the input surface. The controller may be deactivated by providing pressure at the input surface that is greater than the threshold value. In one embodiment, a tactile feedback and/or visual feedback is provided at the controller to indicate controller activation and/or deactivation.

One or more of mode control and game setting parameters associated with an application executing at the console are received, as illustrated in operation 420. The mode control and game setting parameters (i.e. interface parameters) are specific to a particular application executing at the console. In one embodiment, the interface parameters and mode control are received during the initiation of the game and may be dynamically refined based on game state. As a result, as and when there are changes to the interface parameters, the controller receives such changes from the console. The game setting parameters may include parameters related to the application, such as turning sensitivity, gearing ratio, etc., for a car racing video game application, etc. The mode control shared by the particular application may enable the controller circuitry of the controller to activate/deactivate the controller and also to activate/deactivate some of the motions allowed at the controller and such activation and/or deactivation may be based on the game state. The activation results in initializing and configuring the controller so that the input from the controller can be mapped to the received game state. In various embodiments, the various game states received from the console are related to applications that include, but are not limited to, operating system functions, such as navigating a file system or launching applications such as stand alone or networked interactive video games, an internet browser, social networking interfaces, video playback, and audio playback. The particular applications listed are exemplary and are not intended to be limiting. Subsequent receipt of the game state, during the game play or execution of the application may result in overriding the default configuration so as to refine the controller input to comply with the received game state. Such initialization and refinement of controller's configuration during execution of the application at the console allows individual applications to map controls of the application to particular input of the controller. Furthermore, the term "console" should be construed to encompass not only execution of program instructions that render an interactive video game, but further include operations and functions of general computing, interactivity and multimedia interactivity.

Touch input is received at the input surface of the controller, as illustrated in operation 430. The touch input identifies user engagement at the input surface. The touch input is provided using the indicator as a reference location and is interpreted relative to the indicator on the input surface to identify a plurality of input attributes based on the mode control and game setting parameters received from the console, as illustrated in operation 440. The interpreted touch input is transmitted to the console where the touch input is analyzed to identify data points which are correlated to interactions at an application executing at the console, as illustrated in operation 450. The interactions at the console result in controlling actions of a virtual object, or control features, system setting, action or a particular aspect of the interactive application. The analysis of the touch input at the console may result in sending a sensory and/or visual feedback to the controller. In one embodiment, the touch input is analyzed based on a game state and the visual and/or sensory feedback is provided accordingly. For instance, if the user is initiating a video game and has provided sufficient pressure at the input surface that meets or exceeds a predefined threshold value, the controller may be activated to receive touch input for the video game and such activation may be indicated to a user in the form of tactile feedback (i.e. sensory feedback) and/or visual feedback. The activating, receiving, interpreting, and transmitting continues as long as the controller is active and receives touch input for the interactive application and so long as the interactive application is executing through the console. The method concludes with the controller detecting release of the touch input at the input surface and resetting the input location at the input surface for subsequent touch input to a default location, such as the indicator location, as illustrated in operation 460.

Figure 5:
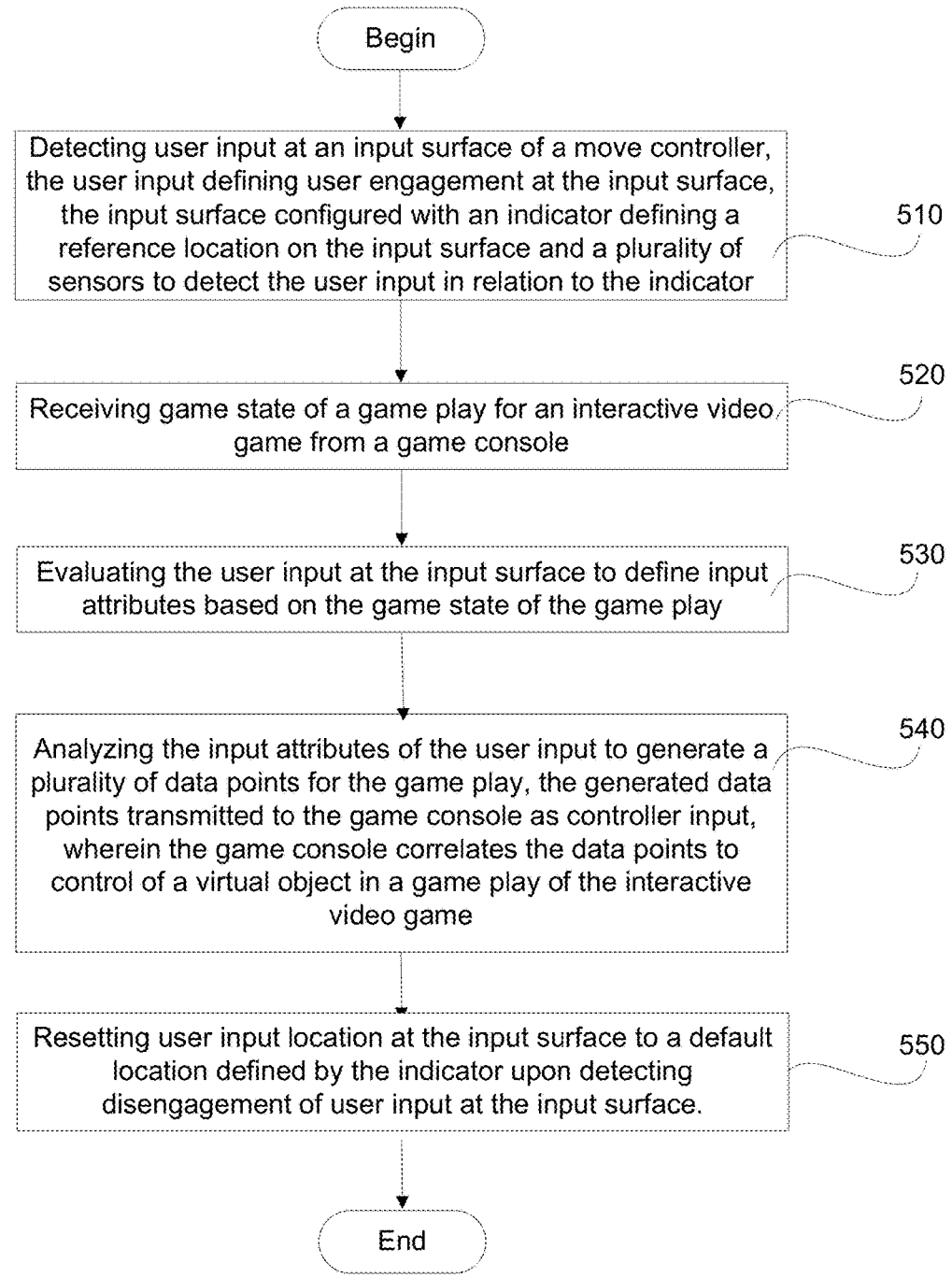
FIG. 5 is an exemplary flow chart illustrating additional operations that are executed when the controller receives touch input, in accordance with one embodiment of the present invention.

FIG. 5 illustrates an exemplary flow chart of operations for a method for interfacing with an interactive video game executing through a console, using a move controller, in one embodiment of the invention. The method begins at operation 510 when touch input is detected at an input surface of the move controller. The touch input may be to activate the controller to receive touch input. The input surface includes an indicator that defines a reference location and a plurality of sensors that are configured to detect the touch input at the input surface. The controller, upon activation, receives game state of the game play for the video game, as illustrated in operation 520. The game state is used to configure the controller so as to map the controller input to comply with the game state. The touch input received at the input surface is evaluated to define input attributes based on the game state, as illustrated in operation 530. The touch input may be evaluated by controller circuitry based on the game state using mode control and game setting parameters received from the console. The mode control and game setting parameters may be specific to the video game and/or may be specific to different game states within the video game.

The input attributes are analyzed to generate a plurality of data points for the game play. In one embodiment, the data points may be generated by measuring magnitude and direction of the touch input using location coordinates of various locations of the touch input in relation to the indicator. The generated data points are transmitted to the console as controller input, as illustrated in operation 540. The console interprets the controller input and translates the input into control and actions at a virtual object in the game play of the interactive video game. The controller circuitry may provide visual and/or sensory feedback in response to the touch input at the input surface based on the evaluation of the touch input. The method concludes with the controller detecting release of the touch input at the input surface and resetting the input location at the input surface to a default location defined by the indicator, for subsequent touch input, as illustrated in operation 550. The process of detecting, receiving, evaluating, and analyzing will continue so long as the controller is active and the touch input is provided at the input surface.

Figure 7:
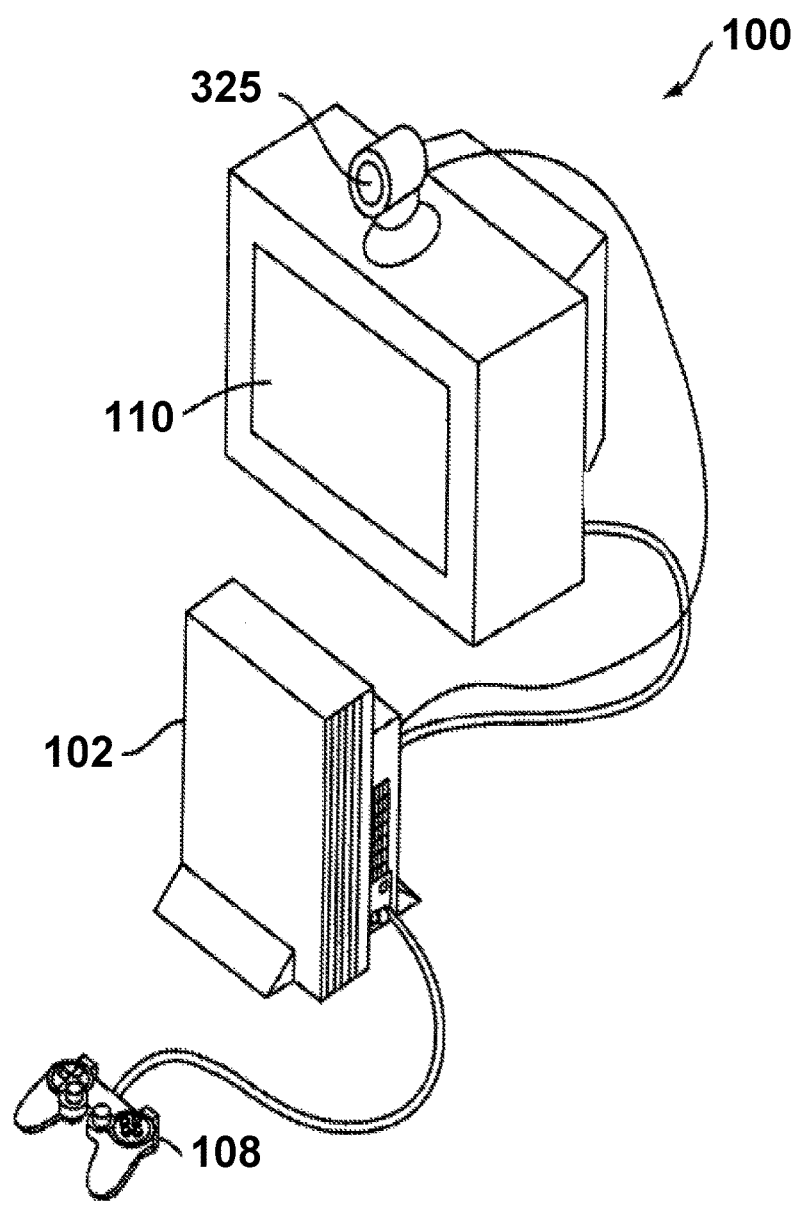
FIG. 7 illustrates an interactive game setup having an image capture device, in one embodiment of the invention.

FIG. 7 illustrates an interactive game setup 100, in accordance with one example embodiment of the present invention. The interactive game setup 100 includes a computer 302, also referred to herein as "console," that is coupled to a display screen 110. An image capture device (e.g., camera) 325 may be placed on top of the display screen 110 and is coupled to the computer 302. Computer 302 is, in one embodiment, a gaming system console which allows users to play video games and interface with the video games through controllers 108. The computer 302 may also be connected to the internet, to allow for interactive on-line gaming. The image capture device 325 is shown placed on top of the display screen 110, but it should be understood that the image capture device 325 can be placed in any other proximate location that will allow it to capture images that are located about in front of the display screen 110. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In one embodiment, image capture device 325 can be as simple as a standard web cam or can include more advanced technology Image capture device 325 may be capable of capturing images, digitizing the images, and communicating the image data back to the computer 302. In some embodiments, the image capture device will have logic integrated therein for performing the digitizing and another embodiment the image capture device 325 will simply transmit an analog video signal to the computer 302 for digitizing. In either case, the image capture device 325 is capable of capturing either color or black and white images of any object located in front of the image capture device 325.

Figure 8:
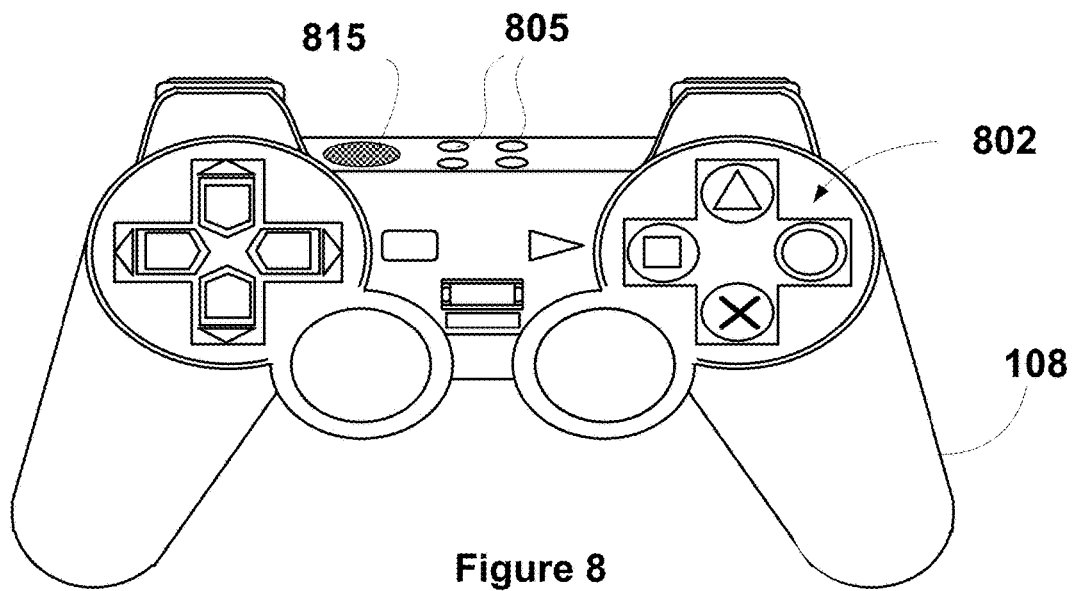
FIG. 8 shows a plain elevation view of an exemplary controller that interacts with an image capture device illustrated in FIG. 7, in one embodiment of the invention.

FIG. 8 shows an exemplary controller 800 that interacts with an image capture device 32 (FIG. 7). Controller 800 includes an interface 802 containing a plurality of interface devices including various buttons, input surfaces and joysticks. The controllers discussed herein can be either wired or wireless. Technologies, such as WiFi, Bluetooth™, IR, sound, and lights may work to interface with a computer, such as a game console. In one embodiment, controller 800 has an LED array 805. The LED array 805 may be configured in various layouts, including a 2×2 stack where each LED may be positioned at a vertex of an imaginary rectangular or square-shaped binding box. By tracking the position and deformation of the binding box as it is projected onto the image plane produced by an image capture device, the transformation and deformations may be analyzed in a video analyzer to decipher position and orientation information of the controller.

LED array 805 may generate infrared or visible light. Image capture device 325 (FIG. 7), (e.g., camera 325 of FIG. 1B), can identify LED array 805 as described above with reference to various other inventive embodiments. Each controller 800 can be designated as Player 1 through, for example, Player 4, using a switch 910 (not shown), which allows a user selection of player number 1-4, or any number of players. Each player number selection corresponds to a unique pattern or modulation of LEDs being illuminated by LED array 805. For example, for Player 1, 1st, 3rd, and 5th LEDs are illuminated. Such player information may be encoded and transmitted in a repeated fashion over time across multiple video frames. It may be desirable to engage in an interleave scheme so the controller or device LEDS can switch between a tracking mode and a transmission mode. In the tracking mode, all LEDs may be turned on during a first portion of a cycle. In the transmission mode, information may be modulated by the LEDs during a second portion of a cycle. Over time, the LEDS transmit tracking and communications information to a video analyzer or suitable device capable of receiving the signal. In the transmission mode, the LEDs may encode information representative of the player I.D. The period and duty cycle may be chosen to accommodate speed of tracking, lighting conditions, number of controllers, etc. By interleaving communications and tracking information, a video capture device may be supplied with adequate information to compute tracking parameters for each controller and to discriminate between controllers. Such discrimination may be used in a video analyzer to isolate each physical controller when monitoring and tracking the position and orientation and other metrics of the controller movement.

In one embodiment, the tracking of an input device may be through an acoustic analyzer. In this embodiment, in the transmission mode, the input device, such as the controller 108 (FIGS. 7 and 8) or controller 300 (FIG. 1B), may transmit tracking and communication information to the acoustic analyzer as acoustic signals. The acoustic analyzer is configured to receive acoustic signals from the controller and convey a gearing amount to be applied to a command or interaction being performed. The acoustic analyzer can be in the form of a computer program segment(s) or specifically defined on a circuit that is designed to process acoustic signal information. The acoustic signal information can therefore include gearing data that may be dynamically set by a program, set on-demand by the user through the input device (e.g., by selecting a button on a controller, a voice command, or the like).

In another embodiment, the tracking of the input device may be through an image analyzer. The image analyzer can include an image capture device 325 (FIG. 7), such as a camera 325 (FIG. 1B), that captures images of a space where a user and an input device are located. In this example, the image analyzer is determining position of the controller 108 (FIGS. 7 and 8) or controller 300 (FIG. 1A) to cause some respective action to a feature of a processing program. The program may be a game, and the feature may be an object that is being controlled by the input device. The image analyzer is further configured to mix the position data with an input gearing value. The gearing value can be provided by the user dynamically during execution or can be set by a program depending on activity within an execution session. The gearing input will set a relative impact on some processing by the computer program based on an input gesture or action by the user. In one embodiment, the gearing will translate a command or action from a user or user input device to a feature of a program. The feature of the program need not be an object that is visible, but can also include the adjustment of a variable used to calculate some parameter, estimation or translation of either sound, vibration or image movement. Gearing will therefore provide an additional sense of control to the interactivity provided to and with a program and features of the program.

In still another embodiment, Mixer analyzer (not shown) is provided. The Mixer analyzer is designed to generate a hybrid effect to a feature of the game. For instance, the Mixer analyzer can take input from a combination of the video analyzer, the image analyzer, the acoustic analyzer, the inertial analyzer, and the like. The Mixer analyzer can therefore, in one embodiment, receive several gearing variables, which can then be mixed and synthesized to generate a hybrid result, command or interaction with a feature of a program. Again, the feature of the program should be broadly understood to include visual and non-visual objects, variables used in the processing of an operation, adjustments to audible reactions, and the like.

In the transmission mode, other information, including commands or state information may be transmitted by the controller or device LEDs and according to known encoding and modulation schemes. On the receiver side, a video analyzer coupled to the video capture device may sync with and track the state of the LEDS and decode the information and controller movements. It is known that higher bandwidth may be achieved by modulating data across frames in the transmission mode cycle.

User interaction with interface 802 may cause one or more of LEDs in LED array 805 to modulate and/or change color. For example, as a user moves a joystick LEDs may change brightness or transmit information. The changes in intensity or color can be monitored by the computer system and provided to a gaming program as an intensity value. Furthermore, each button may be mapped to a change in color or intensity of one or more of the LEDs in LED array 805.

As controller 300 is moved about in three-dimensional space and rotated in one of a roll, yaw, or pitch direction, image capture device 325 (FIG. 7) (such as camera 325 of FIG. 1B) in conjunction with computer system 302 may be capable of identifying these changes and generating a two dimensional vector, for describing movement on the image plane, or a three dimensional vector, for describing movement in three dimensional space. The vector can be provided as a series of coordinates describing relative movement and/or an absolute position with respect to the image capture device 325 (FIG. 7) (e.g., camera 325 of FIG. 1B). As would be evident to those skilled in the art, movement on a plane perpendicular to the line of sight of image capture device 325 (the image plane) can be identified by an absolute position within the image capture zone, while movement of controller closer to image capture device 325 can be identified by the LED array appearing to spread out.

The rectangular configuration of LEDs 805 allows movement of controller 800 on three axes and rotation about each axis to be detected. Although only four LEDs are shown, it should be recognized that this is for exemplary purposes only, and any number of LEDs in any configuration would be possible. As controller 800 is pitched forward or backward, the top and bottom LEDs will get closer to each other while the left and right LEDs remain the same distance apart. Likewise, as the controller yaws left or right, the left and right LEDs will appear to approach each other while the top and bottom LEDs remain the same distance apart. Rolling motion of the controller can be detected by identifying the orientation of the LEDs on the image plane. As the controller moves closer to image capture device 325 (FIG. 7) along the line of sight thereof, all the LEDs will appear to be closer to each other. Finally, the controller's movement along the image plane can be tracked by identifying the location of the LEDs on the image plane, thereby identifying movement along respective x and y axes.

Controller 800 may also include a speaker 815 for generating audible or ultrasonic sound. Speaker 815 may generate sound effects for increased interactivity, or can transmit commands issued from interface 802 to a computer system having a microphone or other elements for receiving the transmissions.

The current embodiments, thus, provide a way for a user to interface with an interactive video game using a controller with an input surface that enables a user to provide more controlled input. The user may receive sufficient sensory and/or visual feedback that is indicative of the touch input at the controller. Other advantages of the invention will become apparent to one skilled in the art.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller for interfacing with an interactive application when executed by a computer, comprising:
   an interface region disposed on a surface of a body of the controller, the interface region including a plurality of interface elements configured for providing input to the interactive application;
   one of the plurality of interface elements being an input surface that is configured to receive touch input, the input surface defined by an indentation in a portion on the surface of the body of the controller, a plurality of sensors of a sensor layer disposed under the input surface for detecting movement of a finger of a user; and
   processing circuitry for analyzing the movement of the finger of the user over the input surface and transmit signals that are used by the interactive application to drive interaction within the interactive application, wherein the processing circuitry includes,
   touch surface circuitry configured to receive raw data corresponding to the touch input from the plurality of sensors, wherein the touch surface circuitry is configured to process raw data received from a location sensor and a point approximator to identify coordinates of the touch input, and process raw data received from a contact detector to verify a magnitude of pressure applied on the input surface exceeds a pre-defined threshold to confirm the touch input.

2. The controller of claim 1, wherein the controller includes a pair of handles disposed adjacent to the body, the pair of handles is configured to be held by hands of the user during operation of the controller.

3. The controller of claim 2, wherein a second one of the plurality of interface elements being a second input surface defined by a second indentation in a second portion on the surface of the body of the controller, a plurality of sensors disposed under the second input surface for detecting the movement of the finger of the user,
   wherein the input surface in the indentation and the second input surface in the second indentation are positioned on the surface of the body of the controller proximate to location of corresponding thumbs of the user's hands, when the controller is held by both hands of the user.

4. The controller of claim 1, wherein the body of the controller is elongated and includes a handle and an object disposed at one end of the handle, the handle having the interface region that includes the input surface with the indentation, the handle is configured for holding by a single hand of a user during operation of the controller.

5. The controller of claim 1, wherein the input surface of the indentation is positioned on the handle proximate to a location of a thumb of the user's single hand, when the controller is held.

6. The controller of claim 1, wherein the controller is communicatively coupled to the computer using one of a wired or wireless interface.

7. The controller of claim 1, wherein the plurality of interface elements includes one or more of buttons, triggers, dials, or visual indicators.

8. The controller of claim 1, wherein the computer is a game console.

9. The controller of claim 1, wherein the computer is a cloud computer that is configured to execute instances of the interactive application on a cloud and transmit data of the interactive application over a network for rendering on a display screen.

10. The controller of claim 1, the processing circuitry is configured to activate or deactivate the input surface for receiving the touch input based on control signals provided by the computer.

11. The controller of claim 10, wherein the activation is based on state of the interactive application executing at the computer.

12. The controller of claim 1, wherein the processing circuitry is configured to,
   detect the magnitude of pressure applied by the touch input on the input surface;
   verify the magnitude of pressure applied and location of the touch input against a value specified in the pre-defined threshold; and
   activate the input surface of the controller for receiving the touch input when the location of the touch input matches a location defined in the pre-defined threshold and magnitude of pressure applied by the touch input at the location exceeds a value specified in the pre-defined threshold.

13. The controller of claim 1, wherein the processing circuitry is configured to provide signals to activate or deactivate one or more of the plurality of interface elements based on control signals provided by the computer.

14. The controller of claim 13, wherein activation or deactivation of one or more of the plurality of interface elements is based on state of the interactive application.

15. The controller of claim 1, further comprising,
   illumination circuitry with a plurality of illumination elements, the illumination circuitry coupled to the processing circuitry to obtain illumination feedback data in response to the detected touch input and to provide visual feedback, wherein the plurality of illumination elements are light emitting diodes.

16. The controller of claim 1, wherein the processing circuitry is configured to determine input attributes of the touch input, the input attributes are used to compute the magnitude of pressure applied, magnitude of displacement and direction of the touch input provided on the input surface.

17. The controller of claim 16, wherein the processing circuitry is configured to lock the touch input at a specific location when the magnitude of pressure applied by the touch input at the specific location exceeds a value specified in the pre-defined threshold.

18. The controller of claim 17, wherein the processing circuitry is further configured to release the lock at the specific location based on a subsequent touch input, the lock being released when the magnitude of pressure applied by the subsequent touch input exceeds a value specified in the pre-defined threshold, wherein the location of the subsequent touch input is any location on the input surface.

19. A controller for interfacing with an interactive application when executed by a computer, comprising:
   an interface region disposed on a surface of a body of the controller, the interface region including a plurality of interface elements configured for providing input to the interactive application;
   the plurality of interface elements includes a first input surface that is configured to receive touch input, the first input surface defined by an indentation in a first portion on the surface of the body of the controller, a first set of sensors of a sensor layer disposed under the first input surface for detecting movement of a finger of a user over the first input surface, and
   a second input surface that is configured to receive touch input, the second input surface defined by the indentation in a second portion on the surface of the body of the controller, a second set of sensors of the sensor layer disposed under the second input surface for detecting movement of the finger of the user over the second input surface;
   processing circuitry for analyzing the movement of the finger of the user over the first input surface, the second input surface and transmit signals that are used by the interactive application to drive interaction within the interactive application, wherein the processing circuitry includes,
   touch surface circuitry configured to receive raw data corresponding to the touch inputs on the first input surface, the second input surface from the plurality of sensors, wherein the touch input circuitry is configured to process raw data received from a location sensor and a point approximator to identify coordinates of the touch inputs on the first input surface, the second input surface, and process raw data received from a contact detector to verify a magnitude of pressure applied on each of the first input surface and the second input surface exceeds a pre-defined threshold to confirm the touch input at the respective first input surface and the second input surface; and
   illumination circuitry with a plurality of illumination elements, the illumination circuitry coupled to the processing circuitry to obtain illumination feedback data and provide visual feedback in response to the touch inputs detected at the first input surface, the second input surface.

20. The controller of claim 19, wherein the visual feedback for the touch input detected at the first input surface includes activating select ones of the plurality of illumination elements disposed at the first input surface and the visual feedback for the touch input detected at the second input surface includes activating select ones of the plurality of illumination elements disposed at the second input surface.

* * * * *